United States Patent
Konishi

(10) Patent No.: US 9,229,660 B2
(45) Date of Patent: Jan. 5, 2016

(54) STORAGE SYSTEM AND METHOD FOR CONTROLLING STORAGE SYSTEM

(71) Applicant: FUJITSU LIMITED, Kawasaki-shi, Kanagawa (JP)

(72) Inventor: Yotaro Konishi, Yokohama (JP)

(73) Assignee: FUJITSU LIMITED, Kawasaki (JP)

(*) Notice: Subject to any disclaimer, the term of this patent is extended or adjusted under 35 U.S.C. 154(b) by 197 days.

(21) Appl. No.: 13/886,623

(22) Filed: May 3, 2013

(65) Prior Publication Data

US 2014/0032839 A1    Jan. 30, 2014

(30) Foreign Application Priority Data

Jul. 27, 2012    (JP) .................................. 2012-167454

(51) Int. Cl.
*G06F 12/00* (2006.01)
*G06F 3/06* (2006.01)

(52) U.S. Cl.
CPC .............. *G06F 3/0689* (2013.01); *G06F 3/061* (2013.01); *G06F 3/0619* (2013.01); *G06F 3/0635* (2013.01); *G06F 3/0646* (2013.01); *G06F 3/0601* (2013.01)

(58) Field of Classification Search
None
See application file for complete search history.

(56) References Cited

U.S. PATENT DOCUMENTS

| | | | | |
|---|---|---|---|---|
| 6,438,647 | B1* | 8/2002 | Nielson et al. | 711/113 |
| 8,595,410 | B2* | 11/2013 | Nagadomi | 711/103 |
| 8,756,381 | B2* | 6/2014 | Muramatsu et al. | 711/154 |
| 2003/0225861 | A1 | 12/2003 | Iwamura et al. | |
| 2013/0067274 | A1* | 3/2013 | Huang et al. | 714/6.22 |

FOREIGN PATENT DOCUMENTS

| | | |
|---|---|---|
| JP | 2004-13215 | 1/2004 |
| JP | 2007-304896 | 11/2007 |

* cited by examiner

*Primary Examiner* — Brian Peugh
(74) *Attorney, Agent, or Firm* — Staas & Halsey LLP

(57) ABSTRACT

According to an aspect of the present invention, provided is a storage system including a plurality of storage devices, a plurality of access control devices, a relay device, and a connection control device. The plurality of access control devices control access to each of the plurality of storage devices. The relay device connects each of the plurality of storage devices to one of the plurality of access control devices. The connection control device instructs, in response to load states of the plurality of access control devices, the relay device to switch an access control device connected to one of the plurality of storage devices so that deviation of loads among the plurality of access control devices is improved.

9 Claims, 19 Drawing Sheets

| HASH VALUE | SERVER IP ADDRESS | DEVICE NAME |
|---|---|---|
| 011001101 | 192.168.1.1 | sda |
| 011001100 | 192.168.1.2 | sdb |
| ... | ... | ... |

| SERVER IP ADDRESS | PROCESSOR USAGE RATE | FREE MEMORY | COMMUNICATION DATA AMOUNT |
|---|---|---|---|
| 192.168.1.1 | 70 | 3 | 80 |
| 192.168.1.2 | 20 | 32 | 20 |
| ... | ... | ... | ... |

FIG. 11

| PHY ID | SAS ADDRESS |
|--------|-------------|
| 0 | xxxxxxx |
| 1 | yyyyyyy |
| 2 | zzzzzzz |
| ... | ... |

331

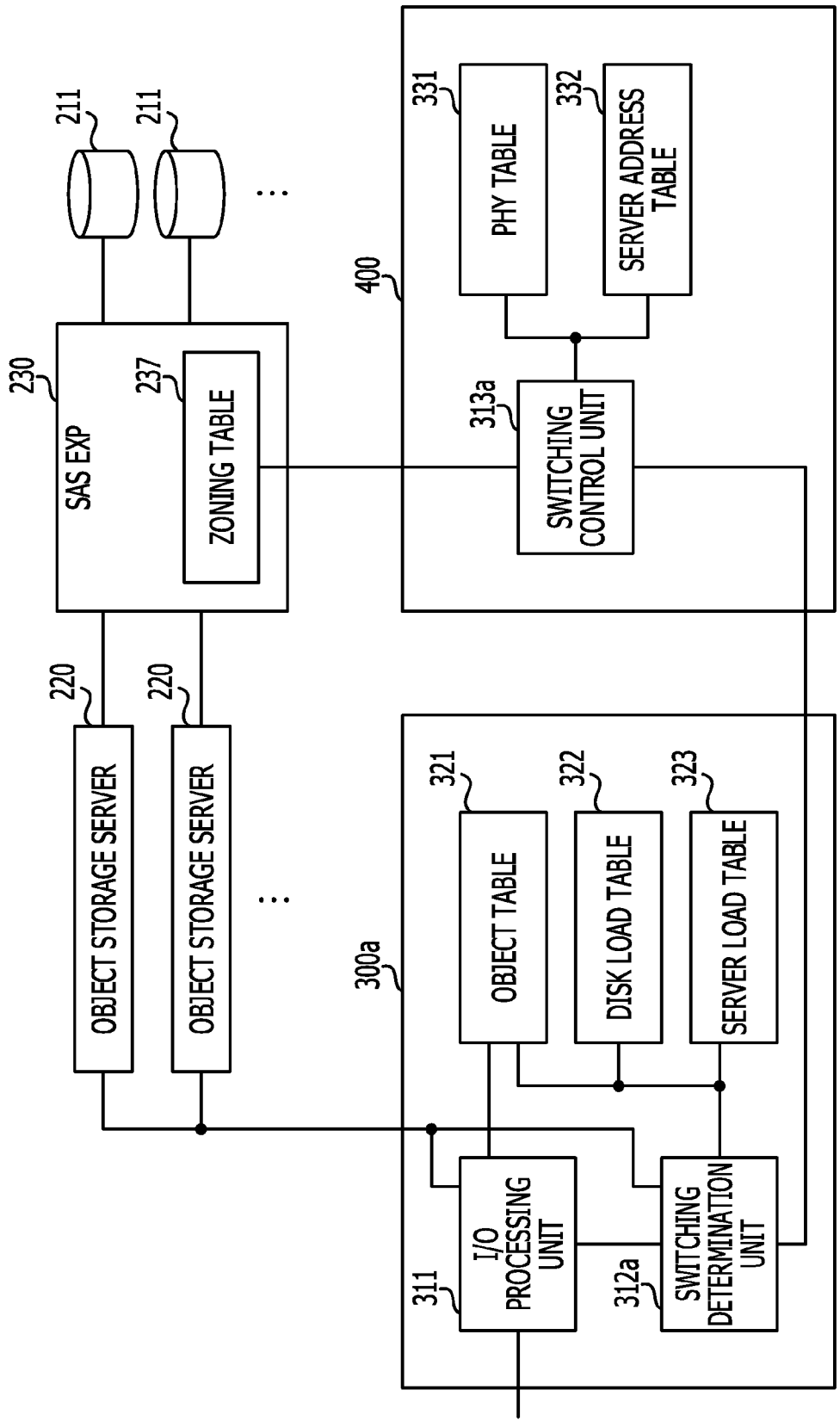

STORAGE SYSTEM AND METHOD FOR CONTROLLING STORAGE SYSTEM

CROSS-REFERENCE TO RELATED APPLICATION

This application is based upon and claims the benefit of priority of the prior Japanese Patent Application No. 2012-167454 filed on Jul. 27, 2012, the entire contents of which are incorporated herein by reference.

FIELD

The embodiments discussed herein are related to a storage system and a method for controlling a storage system.

BACKGROUND

A distributed storage system is realized by clustering a plurality of storage nodes each of which includes a plurality of storage devices and a server controlling writing and reading data to and from the plurality of storage devices. The distributed storage system has a feature that the scalability of the system according to an increase in data to be stored is high. As one type of such a distributed storage system, there has been an object storage system that handles data as an object.

Various kinds of techniques have been proposed that are used for improving performance of the storage system. For example, there has been a storage system that moves a logical volume within a storage subsystem to another storage subsystem so that loads are balanced between the storage subsystems. In addition, there has been a storage system where, in a fibre channel (FC) switch, connections between a plurality of ports individually connected to separate servers and a plurality of ports connected to redundant arrays of inexpensive disks (RAID) device are switched so that the loads of access paths are balanced.

Japanese Laid-open Patent Publication No. 2004-13215 and Japanese Laid-open Patent Publication No. 2007-304896 disclose related techniques.

Broadly speaking, examples of data to be stored in a distributed storage system include "hot" data frequently accessed, and "cold" data rarely accessed after having been stored once, such as data used for a backup. However, in many cases, at the time of storing data, it is not clear which data is hot data and which data is cold data, from among pieces of data to be stored. Therefore, if hot data is intensively stored in storage devices within the same storage node, the load of a server within the storage node becomes excessive, and hence, there has been a problem that performance for accessing individual storage devices connected to the server is significantly reduced.

SUMMARY

According to an aspect of the present invention, provided is a storage system including a plurality of storage devices, a plurality of access control devices, a relay device, and a connection control device. The plurality of access control devices control access to each of the plurality of storage devices. The relay device connects each of the plurality of storage devices to one of the plurality of access control devices. The connection control device instructs, in response to load states of the plurality of access control devices, the relay device to switch an access control device connected to one of the plurality of storage devices so that deviation of loads among the plurality of access control devices is improved.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a diagram illustrating an example of information registered in an object table;

FIG. 10 is a diagram illustrating an example of information registered in a server load table;

FIG. 11 is a diagram illustrating an example of information registered in a PHY table;

FIG. 19 is a block diagram illustrating examples of individual processing functions of a front-end server and a control server according to a third embodiment.

DESCRIPTION OF EMBODIMENTS

Hereinafter, embodiments will be described with reference to drawings.

First Embodiment

Figure 1:
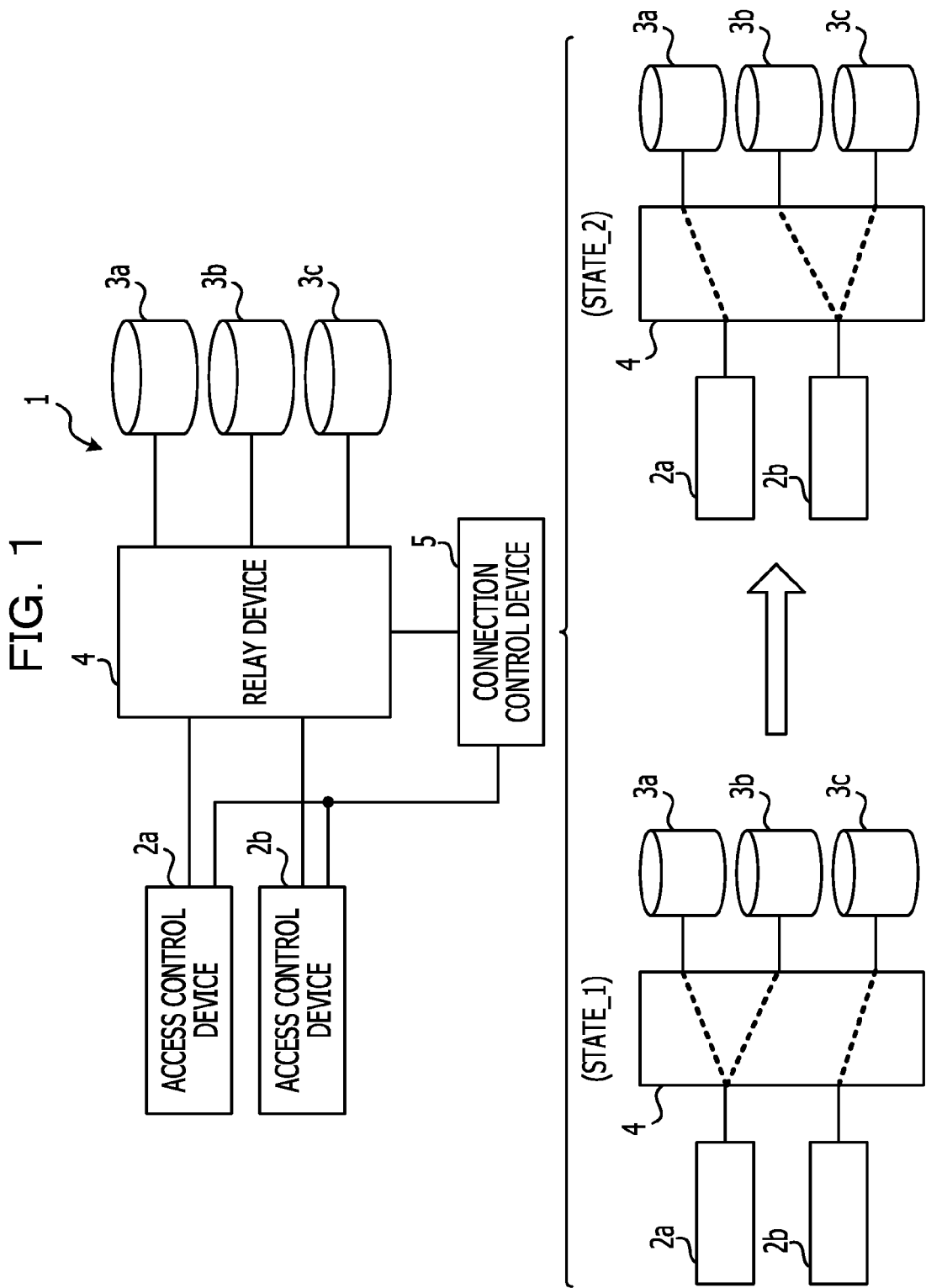
FIG. 1 is a diagram illustrating an example of a configuration and an example of an operation of a storage system according to a first embodiment.

FIG. 1 is a diagram illustrating an example of a configuration and an example of an operation of a storage system according to a first embodiment. A storage system 1 illustrated in FIG. 1 includes a plurality of access control devices 2*a* and 2*b*, a plurality of storage devices 3*a* to 3*c*, a relay device 4, and a connection control device 5.

Each of the access control devices 2*a* and 2*b* controls access to one or more storage devices. For example, each of the access control devices 2*a* and 2*b* accesses a storage device serving as an access destination indicated by a front-end device not illustrated. Owing to such operations of the front-end device, the access control devices 2*a* and 2*b*, and the storage devices 3*a* to 3*c*, it may be possible to realize a distributed storage system. While, in the example in FIG. 1, the two access control devices 2*a* and 2*b* are provided, the number of access control devices may be arbitrarily changed if the number is two or more.

Access to the storage device 3*a* is controlled by one of the access control devices 2*a* and 2*b*. In the same way, access to the storage device 3*b* is also controlled by one of the access control devices 2*a* and 2*b*, and in the same way, access to the storage device 3*c* is also controlled by one of the access control devices 2*a* and 2*b*. While, in the example in FIG. 1, the three storage devices 3*a* to 3*c* are provided, the number of storage devices may be arbitrarily changed if the number is two or more.

The relay device 4 connects each of the storage devices 3*a* to 3*c* to one of the access control devices 2*a* and 2*b*. The relay device 4 may connect a plurality of storage devices to one access control device.

In response to the load state of each of the access control devices 2*a* and 2*b*, the connection control device 5 controls a connection switching operation in the relay device 4 so that loads are distributed to the individual access control devices 2*a* and 2*b*. Accordingly, the reduction of performance for accessing the storage devices 3*a* to 3*c* may be suppressed.

The connection control device 5 may instruct, through another control device, the relay device 4 to perform connection switching. The connection control device 5 may be a device integrated with the above-mentioned front-end device.

As a method where the connection control device 5 recognizes the load states of the access control devices 2*a* and 2*b*, various methods may be applicable. For example, the connection control device 5 may acquire, from each of the access control devices 2*a* and 2*b*, or alternatively, from the above-mentioned front-end device, information indicating a current load state in each of the access control devices 2*a* and 2*b*.

As a method for connection switching performed in the relay device 4 on the basis of an instruction from the connection control device 5, for example, there is a method where a storage device connected to an access control device is caused to be connected to another access control device. There is also a method where a storage device connected to an access control device and a storage device connected to another access control device are replaced with each other.

Next, an example of a connection switching operation in the relay device 4 will be described. First, as illustrated in a state_1 in FIG. 1, it is assumed that the relay device 4 connects the access control device 2*a* and the storage devices 3*a* and 3*b* to each other and connects the access control device 2*b* and the storage device 3*c* to each other.

Here, it is assumed that the connection control device 5 has determined that a load parameter indicating the load state in the access control device 2*a* has exceeded a predetermined threshold value. As a state where the load parameter relating to the access control device 2*a* exceeds the threshold value, for example, a case may be considered where a storage device (for example, the storage device 3*a*) connected to the access control device 2*a* is intensively accessed. In such a state, communication volume of the access control device 2*a* becomes excessive, and it may be likely that performance for accessing the storage devices 3*a* and 3*b* connected to the access control device 2*a* is significantly reduced.

When having determined that the load parameter relating to the access control device 2*a* has exceeded the threshold value, the connection control device 5 instructs the relay device 4 to connect, to the other access control device 2*b*, at least one of the storage devices 3*a* and 3*b* connected to the access control device 2*a*. In a state_2 in FIG. 1, as an example, it is assumed that the connection control device 5 has instructed the relay device 4 to switch the connection destination of the storage device 3*b* from the access control device 2*a* to the access control device 2*b*.

Owing to such a connection switching operation, the communication volume of the access control device 2*a* is suppressed, and the communication volume of the access control device 2*b* increases. Therefore, the deviation of a load between the access control devices 2*a* and 2*b* is improved. The reduction of the performance for accessing the storage devices 3*a* and 3*b* is suppressed which occurs by the communication volume in the access control device 2*a* becoming excessive, and it may become possible to maintain high access performance as for the whole of the storage devices 3*a* to 3*c*.

Second Embodiment

Next, an example of a case where the storage system 1 illustrated in FIG. 1 is applied to an object storage system will be described. Here, first, a reference example of the object storage system will be illustrated in FIG. 2, and a problem point in the object storage system will be described with reference to FIG. 2. After that, a second embodiment will be described.

Figure 2:
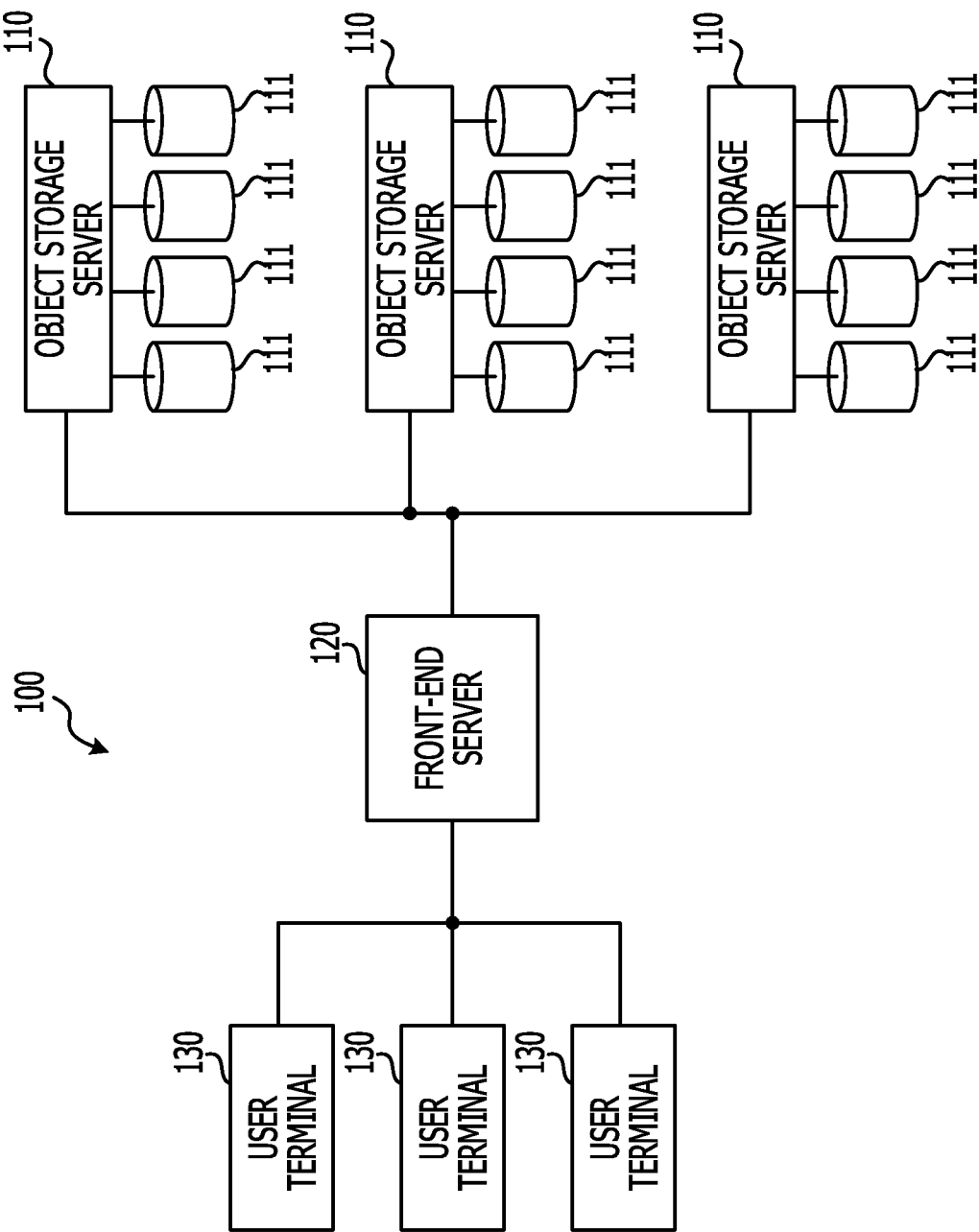
FIG. 2 is a diagram illustrating a reference example of an object storage system.

FIG. 2 is a diagram illustrating a reference example of an object storage system. In FIG. 2, a storage node is configured with an object storage server 110 and a plurality of storage devices 111 connected to the object storage server 110. In a storage system 100, a plurality of storage nodes are connected to a front-end server 120. In addition, a plurality of user terminals 130 are connected to the front-end server 120.

The front-end server 120 receives a query from a user terminal 130, and determines a storage node for reading or writing an object. The front-end server 120 calculates a hash value from, for example, path information of an object given notice by the user terminal 130. With reference to a preliminarily set correspondence table, the front-end server 120 determines an object storage server 110 and a storage device 111, associated with the calculated hash value.

To the determined object storage server 110, the front-end server 120 outputs a PUT request (write request) or a GET request (read request) for the object. The object storage server 110 having received the request from the front-end server 120 performs reading or writing of the object from or to the storage device 111 specified by the front-end server 120.

Broadly speaking, examples of objects stored in each storage node include a "hot" object whose access frequency is high, and a "cold" object whose access frequency is low, such as an object used for a backup. Generally, it is known that almost all objects stored in an object storage system are cold objects.

Here, at the time of storing data, it may be difficult for the front-end server 120 to judge which data is hot data and which data is cold data, from among pieces of data to be stored. Therefore, a case may occur where, from among a plurality of storage nodes, hot objects are intensively stored in a storage node and hot objects are rarely stored in another storage node.

In this way, when hot objects have been intensively stored in a storage node, there occurs a problem that the access speed to the storage device 111 by the object storage server 110 is decreased in that storage node. On the other hand, in the storage node in which hot objects are rarely stored, it may be said that the resource of the object storage server 110 is not used efficiently.

As a method for rectifying the imbalance of access between storage nodes, a method may be considered where a hot object and a cold object are replaced with each other between the storage nodes. However, in this method, data transfer occurs between storage nodes separately from data transfer occurring, in a normal work, between the front-end server 120 and the storage node, and hence, extra traffic occurs in a network. In addition, it is also required that, in the correspondence table where a hash value and a storage location are associated with each other, the front-end server 120 updates information corresponding to an object whose storage location has been moved.

On such a problem, in the second embodiment illustrated hereinafter, a plurality of object storage servers and a plurality of storage devices are connected to each other through a relay device capable of changing connection relationship therebetween. In response to a load state in each object storage server, a connection state in the relay device is changed, and hence, the imbalance of access between the object storage servers is rectified without changing the storage location of an object.

Figure 3:
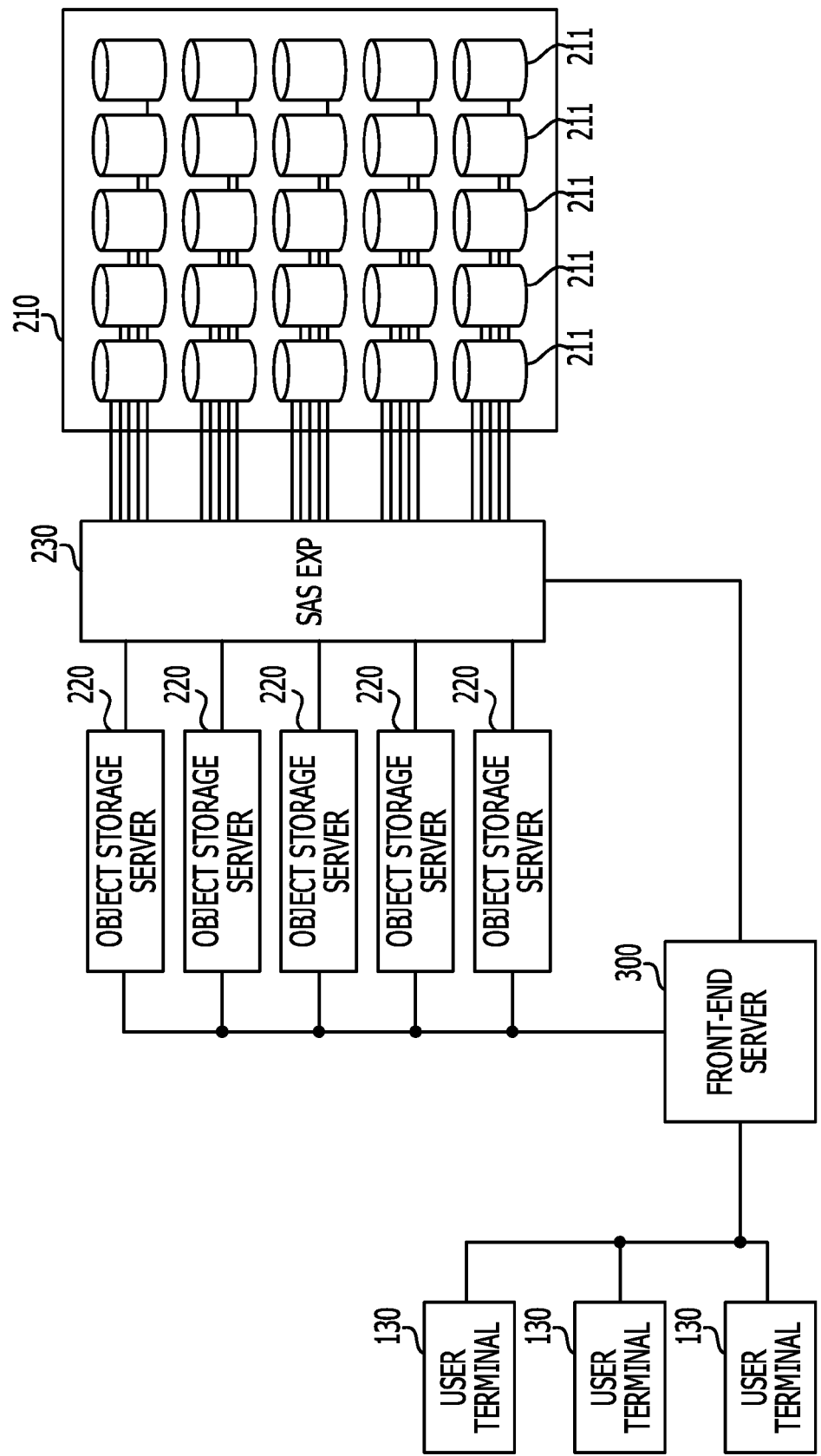
FIG. 3 is a diagram illustrating an example of an entire configuration of a storage system according to a second embodiment.

FIG. 3 is a diagram illustrating an example of an entire configuration of a storage system according to the second embodiment. A storage system 200 illustrated in FIG. 3 includes a disk enclosure 210, a plurality of object storage servers 220, a serial attached small computer system interface (SAS) expander 230 (in FIG. 3, expressed as "SAS EXP"), a front-end server 300, and a plurality of user terminals 130. The user terminal 130 is a device performing similar processing to the user terminal 130 illustrated in FIG. 2.

In the disk enclosure 210, a plurality of storage devices are mounted that are to be the storage targets of objects. According to the present embodiment, a plurality of hard disk drives (HDDs) 211 are mounted in the disk enclosure 210. As the storage device mounted in the disk enclosure 210, another type of non-volatile storage medium such as a solid state drive (SSD) or, alternatively, a disk array including a plurality of HDDs or a plurality of SSDs may also be used. In the disk enclosure 210, two or more storage devices whose number is arbitrary may be mounted.

The object storage server 220 is a device corresponding to the access control device 2a or 2b in FIG. 1 or the object storage server 110 in FIG. 2. Each of the object storage servers 220 is connected to the disk enclosure 210 through the SAS expander 230.

The SAS expander 230 is a device corresponding to the relay device 4 in FIG. 1. In response to an instruction from the front-end server 300, the SAS expander 230 connects each of the HDDs 211 within the disk enclosure 210, to either one of the object storage servers 220.

Owing to such a connection operation of the SAS expander 230, each of the object storage servers 220 performs, in response to an access request from the front-end server 300, reading or writing of an object on an HDD 211 connected through the SAS expander 230. In other words, in the storage system 200, a storage node is configured with one object storage server 220 and an arbitrary HDD 211 connected to this object storage server 220 through the SAS expander 230. By causing the SAS expander 230 to change a connection relationship between the object storage servers 220 and the HDDs 211, the front-end server 300 may dynamically change the HDD 211 configuring each storage node.

While, in FIG. 3, five object storage servers 220 are illustrated as an example, two or more object storage servers 220 whose number is arbitrary may be provided in the storage system 200.

The front-end server 300 is a device corresponding to the front-end server 120 in FIG. 2, and a device having the function of the connection control device 5 in FIG. 1. In the same way as the front-end server 120 in FIG. 2, the front-end server 300 receives a query from a user terminal 130, and determines an object storage server 220 and an HDD 211, used for reading or writing an object. The front-end server 300 outputs a PUT request or a GET request for the object to the determined object storage server 220 so as to request to store the object in the determined HDD 211 or read the object from the HDD 211.

In addition to this, the front-end server 300 executes processing for detecting the load state of access with respect to each HDD 211 within the disk enclosure 210 and processing for detecting the processing load state of each object storage server 220. In response to the detected load states, the front-end server 300 controls an operation in the SAS expander 230, for switching a connection between the object storage server 220 and the HDD 211. The front-end server 300 causes the SAS expander 230 to switch the HDD 211 connected to each object storage server 220 so that loads are distributed among the individual object storage servers 220, and dynamically changes the configuration of the storage node.

Figure 4:
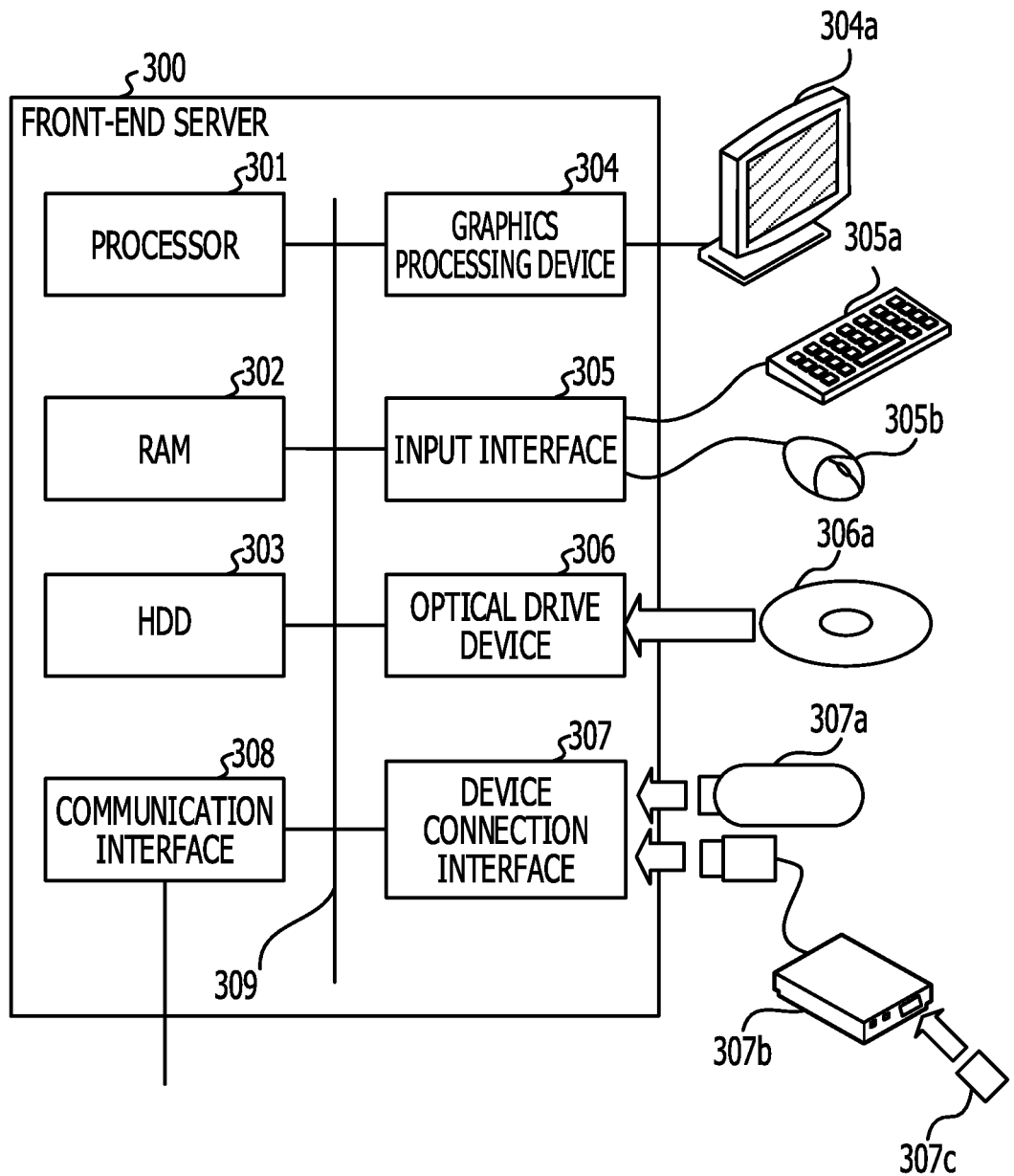
FIG. 4 is a diagram illustrating an example of a hardware configuration of a front-end server.

FIG. 4 is a diagram illustrating an example of a hardware configuration of a front-end server. A front-end server 300 is realized as, for example, a computer as illustrated in FIG. 4.

The entire device of the front-end server 300 is controlled by a processor 301. A random access memory (RAM) 302 and a plurality of peripheral devices are connected to the processor 301 through a bus 309. The processor 301 may be a multiprocessor. The processor 301 is, for example, a central processing unit (CPU), a microprocessing unit (MPU), a digital signal processor (DSP), an application specific integrated circuit (ASIC), or a programmable logic device (PLD). The processor 301 may be the combination of two or more elements from among the CPU, the MPU, the DSP, the ASIC, and the PLD.

The RAM 302 is used as a main memory of the front-end server 300. At least a portion of an operating system (OS) program or application programs, which is executed by the processor 301, is temporarily stored in the RAM 302. Various kinds of data desired for processing performed by the processor 301 are stored in the RAM 302.

The peripheral devices connected to the bus 309 include an HDD 303, a graphics processing device 304, an input interface 305, an optical drive device 306, a device connection interface 307, and a communication interface 308.

The HDD 303 is used as an auxiliary storage device of the front-end server 300. The OS program, the application programs, and various kinds of data are stored in the HDD 303. As the auxiliary storage device, another type of non-volatile storage device such as an SSD may also be used.

A monitor 304a is connected to the graphics processing device 304. In accordance with an instruction from the processor 301, the graphics processing device 304 causes an image to be displayed on the screen of the monitor 304a. As the monitor 304a, a display device utilizing a cathode ray tube (CRT), a liquid crystal display device, or the like may be used.

For example, a keyboard 305a and a mouse 305b are connected to the input interface 305. The input interface 305 transmits, to the processor 301, signals output from the keyboard 305a or the mouse 305b. The mouse 305b is an example of a pointing device, and another pointing device may also be used. As the other pointing device, a touch panel, a tablet, a touch-pad, a trackball, or the like may also be used.

The optical drive device 306 reads, using a laser light or the like, data recorded in an optical disk 306a. The optical disk 306a is a portable recording medium where data is recorded so as to be readable owing to the reflection of light. Examples of the optical disk 306a include a digital versatile disc (DVD), a DVD-RAM, a compact disc read-only memory (CD-ROM), a compact disc recordable/rewritable (CD-R/RW), and the like.

The device connection interface 307 is a communication interface used for connecting a peripheral device to the front-end server 300. For example, it may be possible to connect a memory device 307a and a memory reader/writer 307b to the device connection interface 307. The memory device 307a is a recording medium equipped with a function for communicating with the device connection interface 307. The memory reader/writer 307b is a device for writing data into a memory card 307c or reading data from the memory card 307c. The memory card 307c is a card-type recording medium.

The communication interface 308 transmits and receives data to and from another device through a network not illustrated. In the present embodiment, the object storage servers 220, the user terminals 130, and the SAS expander 230 are connected to the communication interface 308.

The front-end server 300 may communicate with the object storage servers 220 and the user terminals 130 in accordance with a communication standard and communicate with the SAS expander 230 in accordance with another different communication standard. In this case, a communication interface used for communicating with the object storage server 220 and the user terminal 130 and a communication interface used for communicating with the SAS expander 230 may be individually provided independently from each other.

Owing to such a hardware configuration as described above, it may be possible to realize the processing function of the front-end server 300. The individual object storage servers 220 and the individual user terminals 130 illustrated in FIG. 3 may be realized by computers having the hardware illustrated in FIG. 4. In addition, the access control devices 2a and 2b and the connection control device 5 may be realized by computers having the hardware illustrated in FIG. 4.

Figure 5:
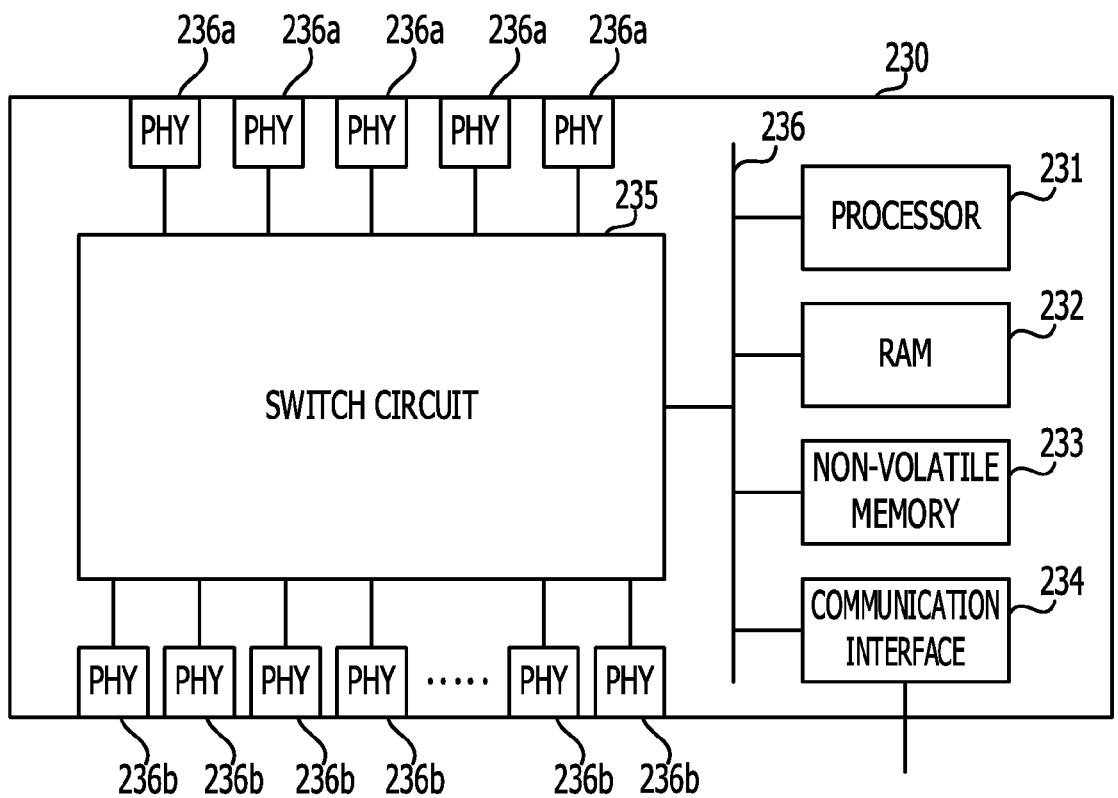
FIG. 5 is a diagram illustrating an example of a hardware configuration of an SAS expander.

FIG. 5 is a diagram illustrating an example of a hardware configuration of an SAS expander.

The entire device of the SAS expander 230 is controlled by a processor 231. A RAM 232, a non-volatile memory 233, a communication interface 234, and a switch circuit 235 are connected to the processor 231 through a bus 236.

The processor 231 includes, for example, one CPU or a plurality of CPUs. The RAM 232 is used as a main memory of the SAS expander 230. At least a portion of various kinds of firmware executed by the processor 231 is temporarily stored in the RAM 232. Various kinds of data desired for processing performed by the processor 231 are stored in the RAM 232.

The non-volatile memory 233 is, for example, a flash memory or an HDD. The non-volatile memory 233 is used as an auxiliary storage device of the SAS expander 230. Various kinds of firmware executed by the processor 231 and various kinds of data desired for execution of the firmware are stored in the non-volatile memory 233. As an example of the data desired for execution of the firmware, there is a zoning table described later.

The communication interface 234 transmits and receives data to and from an external device through a communication cable. According to the present embodiment, the front-end server 300 is connected to the communication interface 234.

A plurality of physical layer circuits (PHYs) are connected to the switch circuit 235. Under the control of the processor 231, the switch circuit 235 performs switching of data transmitted or received between devices connected to the PHYs.

One of the object storage servers 220 or one of the HDDs 211 within the disk enclosure 210 is connected to a PHY. In FIG. 5, for the sake of explaining in a simplified manner, a PHY to which an object storage server 220 is connected is expressed as "PHY 236a", and a PHY to which an HDD 211 within the disk enclosure 210 is connected is expressed as "PHY 236b".

The processor 231 controls a switching operation in the switch circuit 235 so that one PHY 236b or a plurality of PHYs 236b are connected to each of the PHYs 236a and only one PHY 236a is connected to each of the PHYs 236b.

Figure 6:
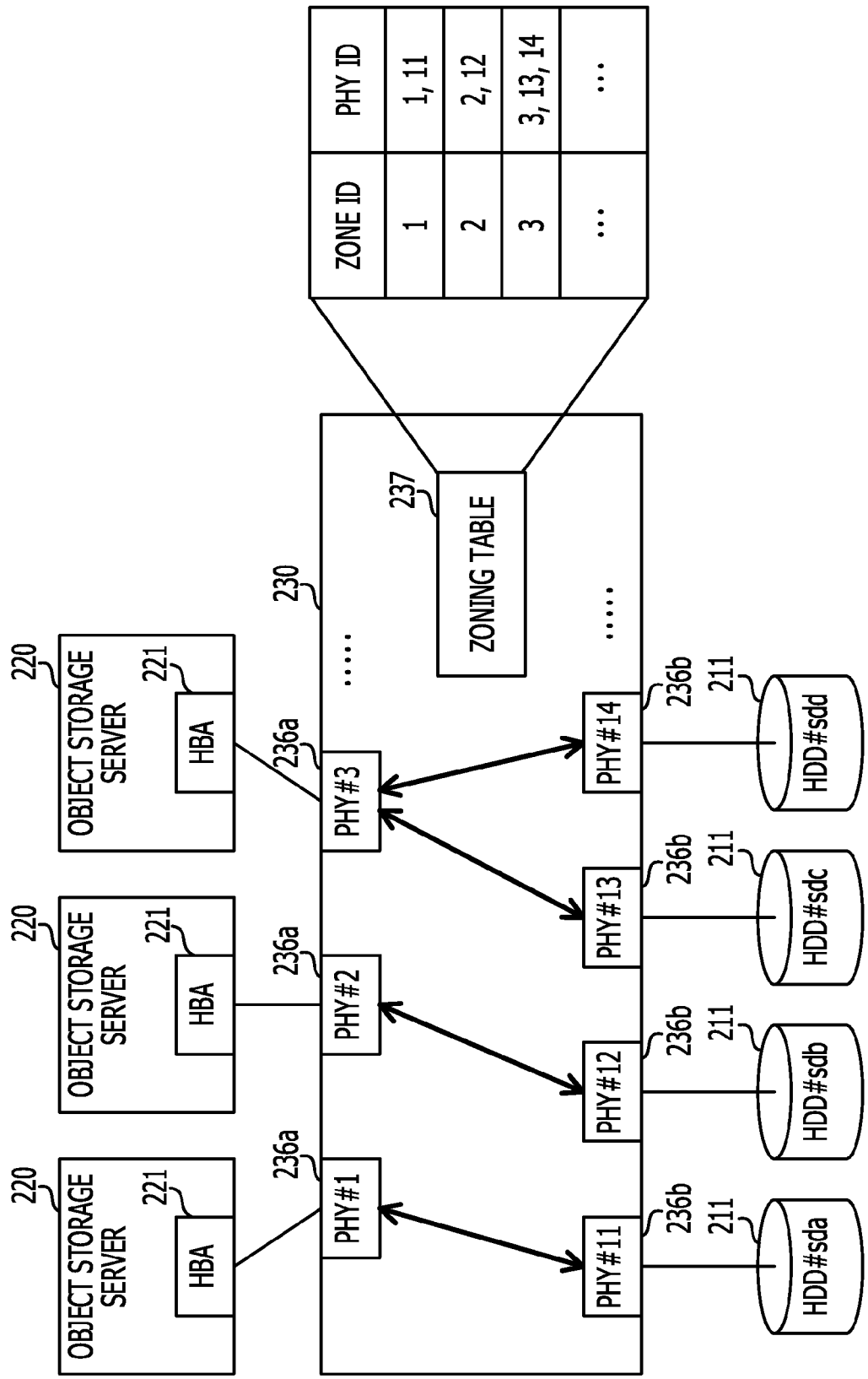
FIG. 6 is a diagram for explaining zoning control in an SAS expander.

FIG. 6 is a diagram for explaining zoning control in an SAS expander. A host bus adaptor (NBA) 221 illustrated in FIG. 6 is an example of a communication interface included in each object storage server 220. In accordance with an SAS standard, the HBA 221 transmits a read request or a write request to an HDD 211 connected through the SAS expander 230.

An identifier (ID) is assigned to each PHY in the SAS expander 230. In the example in FIG. 6, three PHYs 236a to which "1", "2", and "3" are individually assigned and four PHYs 236b to which "11", "12", "13", and "14" are individually assigned are illustrated. In the following description, a PHY to which an ID "x" is assigned is referred to as "PHY#x".

In the example in FIG. 6, the HBAs 221 in the object storage servers 220 are individually connected to the PHY#1, PHY#2, and PHY#3. An HDD 211 (hereinafter, referred to as "HDD#sda") whose device name is "sda" is connected to the PHY#11. An HDD 211 (hereinafter, referred to as "HDD#sdb") whose device name is "sdb" is connected to the PHY#12. An HDD 211 (hereinafter, referred to as "HDD#sdc") whose device name is "sdc" is connected to the PHY#13. An HDD 211 (hereinafter, referred to as "HDD#sdd") whose device name is "sdd" is connected to the PHY#14.

In the non-volatile memory 233 in the SAS expander 230, a zoning table 237 is stored. The zoning table 237 is information used for determining a connection state between the PHYs in the SAS expander 230, and set by the processor 231 in the SAS expander 230 in accordance with an instruction from the front-end server 300. The front-end server 300 transmits, for example, a serial management protocol (SMP) command, and hence, may instruct the SAS expander 230 to update the zoning table 237.

In the zoning table 237, a plurality of IDs of the PHYs are registered with respect to each zone ID. For each zone ID, the ID of one of the PHYs 236a connected to the object storage servers 220 and the IDs of one or more PHYs 236b connected to the HDDs 211 are registered. The processor 231 in the SAS expander 230 controls the switch circuit 235 so that the PHY 236a and the PHY 236b registered for each zone ID are connected to each other.

For example, for the zone ID "1" illustrated in FIG. 6, "1" and "11" are registered as the IDs of the PHYs. In this case, the switch circuit 235 in the SAS expander 230 conductively connects the PHY#1 and the PHY#11 to each other. Accordingly, it may become possible for the object storage server 220 connected to the PHY#1 to access the HDD#sda connected to the PHY#11.

In addition, for the zone ID "3" illustrated in FIG. 6, "3", "13", and "14" are registered as the IDs of the PHYs. In this case, the switch circuit 235 in the SAS expander 230 conductively connects the PHY#3 and the PHY#13 to each other, and conductively connects the PHY#3 and the PHY#14 to each other. Accordingly, it may become possible for the object storage server 220 connected to the PHY#3 to access the HDD#sdc connected to the PHY#13 and the HDD#sdd connected to the PHY#14.

Figure 7:
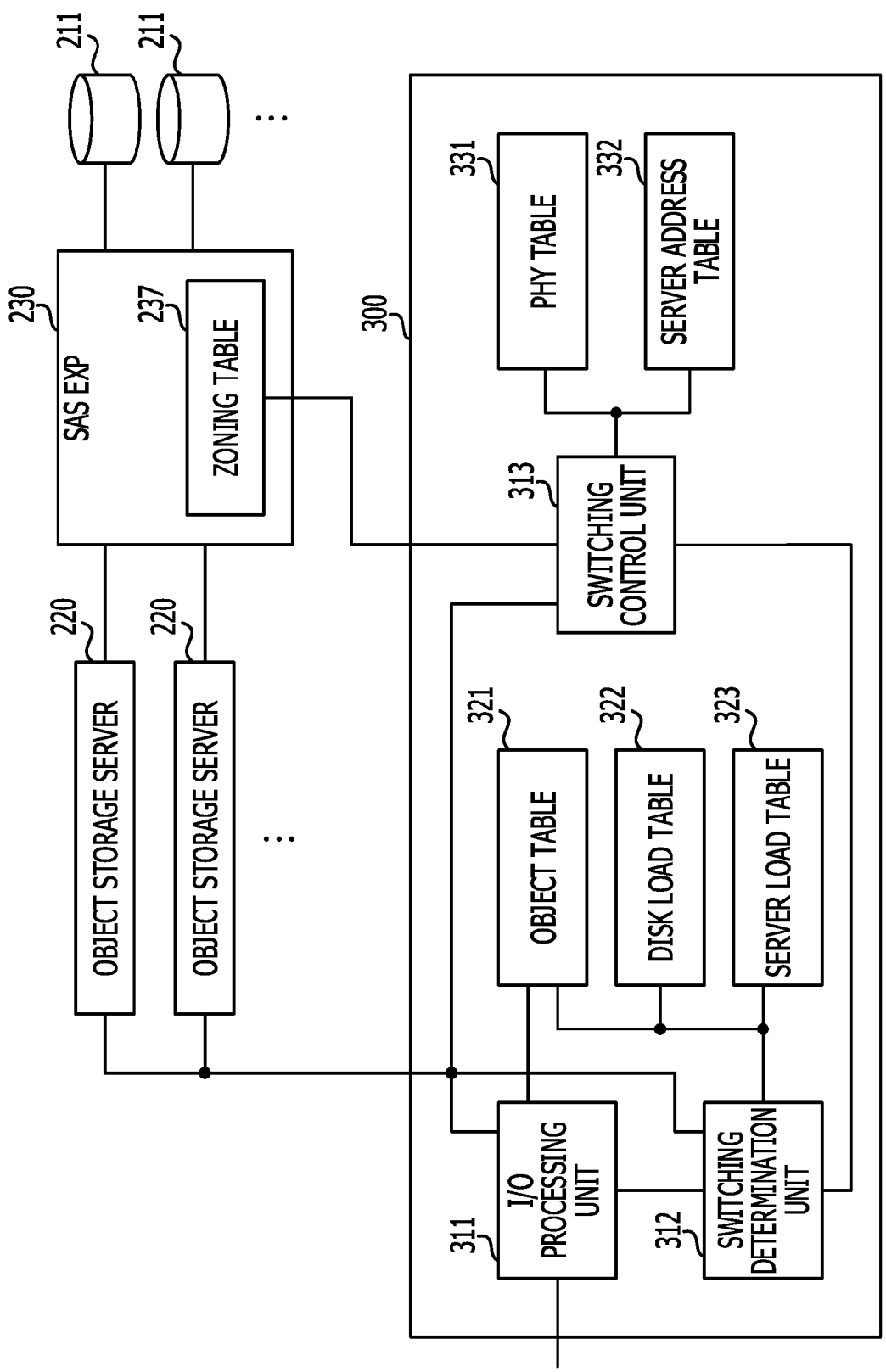
FIG. 7 is a block diagram illustrating an example of a processing function of a front-end server.

FIG. 7 is a block diagram illustrating an example of a processing function of a front-end server.

The front-end server 300 includes an in/out (I/O) processing unit 311, a switching determination unit 312, and a switching control unit 313. For example, the processor 301 in the front-end server 300 executes a predetermined application program, and hence, processing in each of the individual units may be realized.

In addition, in a storage device within the front-end server 300, an object table 321, a disk load table 322, a server load table 323, a PHY table 331, and a server address table 332 are stored. The object table 321, the PHY table 331, and the server address table 332 are stored in, for example, the HDD 303 in the front-end server 300, and expanded in the RAM 302 to be referred to by the processor 301. The disk load table 322 and the server load table 323 are stored in, for example, the RAM 302 in the front-end server 300.

The I/O processing unit 311 receives, from each of the plurality of user terminals 130, a query used for requesting to store or read an object, across the board, and executes I/O processing for the object corresponding to the query. On the basis of the received query, the I/O processing unit 311 refers to the object table 321, and determines an HDD 211 serving as an access destination and an object storage server 220 to route through. The I/O processing unit 311 transmits, to the determined object storage server 220, a PUT request or a GET request corresponding to the received query.

The switching determination unit 312 monitors a load state of each HDD 211 within the disk enclosure 210 and each object storage server 220. In response to the load states of the HDDs 211 and the object storage servers 220, the switching determination unit 312 determines the combination of an object storage server 220 and an HDD 211 where switching of a connection is to be performed in the SAS expander 230.

The switching determination unit 312 monitors a query received by the I/O processing unit 311 from a user terminal 130, and registers, on the basis of the monitoring result, information indicating the load state of each HDD 211, in the disk load table 322. In addition, the switching determination unit 312 acquires, from each object storage server 220, information indicating the load state in the server, and registers the information in the server load table 323.

The switching determination unit 312 compares numerical values, registered in the disk load table 322 and the server load table 323, with threshold values, and hence, identifies the object storage server 220 whose load has become excessive. In addition, on the basis of the disk load table 322 and the server load table 323, the switching determination unit 312 determines the combination of an object storage server 220 and an HDD 211 where switching of a connection is to be performed, so that loads are distributed among the object storage servers 220.

The switching control unit 313 updates the zoning table 237 within the SAS expander 230 so that the object storage server 220 and the HDD 211, determined by the switching determination unit 312, are connected to each other. At the time of the update of the zoning table 237 the switching control unit 313 identifies, on the basis of the PHY table 331 and the server address table 332, the IDs of PHYs on the SAS expander 230 where the object storage server 220 and the HDD 211, determined as targets of switching of a connection, are individually connected to the PHYs. When identifying the ID of the PHY to which the HDD 211 is connected, the switching control unit 313 acquires an SAS address of the HDD 211, from the object storage server 220 to which the HDD 211 is currently connected.

FIG. 8 is a diagram illustrating an example of information registered in an object table.

The query received by the I/O processing unit 311 from the user terminal 130 includes a uniform resource locator (URL) indicating a path of an object. The URL includes metadata of the object such as, for example, an account name of a user or an object name. When storing an object is requested, the query also includes actual data of the object.

Using a one-way hash function such as, for example, a Message Digest Algorithm 5 (MD5), the I/O processing unit 311 converts the URL of an object, received from the user terminal 130, and calculates a hash value having a given width. On the other hand, as illustrated in FIG. 8, in the object table 321, a "server IP address" indicating an internet protocol (IP) address of an object storage server 220 and a "device name" used for identifying an HDD 211 within the disk enclosure 210 are registered in association with the hash value.

The I/O processing unit 311 acquires, from the object table 321, the server IP address and the device name, associated with the hash value calculated on the basis of the URL of the object, and identifies the object storage server 220 caused to execute reading or writing of the object and the HDD 211 serving as the storage destination or the read source of the object. The I/O processing unit 311 transmits a message corresponding to the query, to the identified object storage server 220. When storing an object has been requested, a PUT request message is transmitted, and when reading an object has been requested, a GET request message is transmitted.

The bit width of a hash value registered in the object table 321 may be smaller than the bit width of the hash value calculated from the URL of an object. In this case, the I/O processing unit 311 bit-shifts the hash value calculated from the URL of an object so that the hash value calculated from the URL matches the bit width of a hash value registered in the object table 321. The I/O processing unit 311 acquires, from the object table 321, a server IP address and a device name, associated with the bit-shifted hash value.

The message transmitted from I/O processing unit 311 to the object storage server 220 includes, for example, a command name such as PUT or GET, a URL indicating a path of an object, a message header including user authentication information or the like, and a message body. The message body of a PUT request message includes actual data of the object to be stored. In the URL included in the message, for example, an IP address of an object storage server 220 serving as a transmission destination of the message, a device name of an HDD 211 serving as an access destination, and an object name are described. On the basis of these pieces of information included in the received message, the object storage server 220 accesses the HDD 211 serving as the storage destination or the read source of the object through the SAS expander 230.

Figure 9:
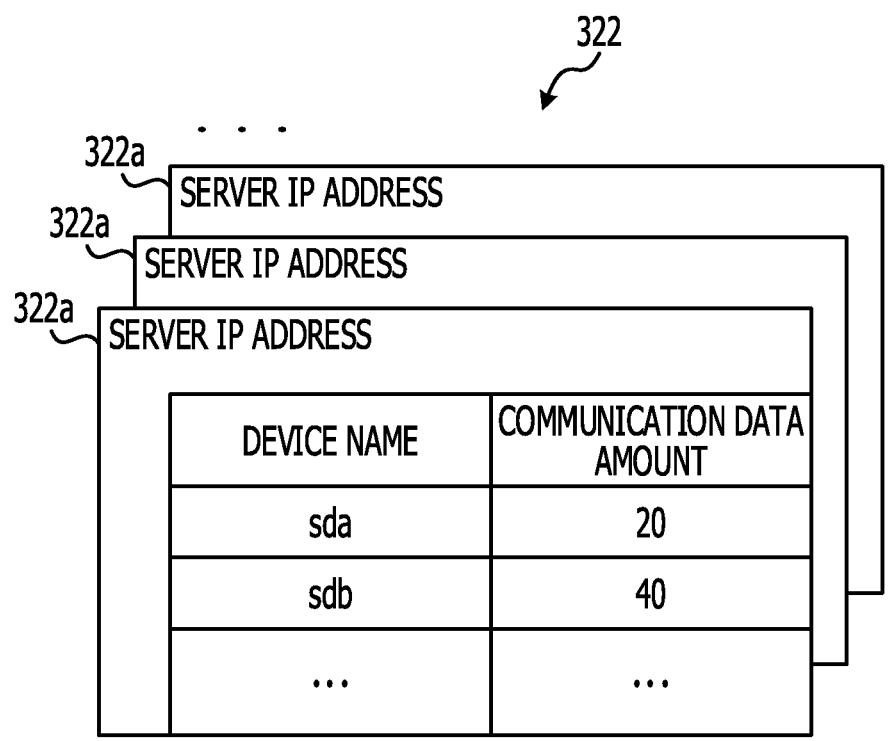
FIG. 9 is a diagram illustrating an example of information registered in a disk load table.

FIG. 9 is a diagram illustrating an example of information registered in a disk load table. The disk load table 322 is a management table used for holding a parameter indicating a load state of each HDD 211 within the disk enclosure 210.

In the disk load table 322, a record 322a is provided with respect to each object storage server 220. In each record 322a, a server IP address is registered that is used for identifying the object storage server 220, the switching determination unit 312 may identify the record 322a corresponding to a desired object storage server 220, from the server IP address.

In each record 322a, a "device name" is registered that is used for identifying the HDD 211 currently connected to the corresponding object storage server 220. The device names are registered whose number just corresponds to the number of HDDs 211 currently connected to the corresponding object storage server 220.

In each record 322a, "communication data amount" serving as an example of a parameter indicating a load state is registered in association with each device name. The communication data amount indicates an amount of data transmitted or received to or from the corresponding HDD 211 in the latest unit time. The communication data amount may be, for example, an amount of data read from the corresponding HDD 211.

The switching determination unit 312 monitors queries received by the I/O processing unit 311 from the user terminals 130, and frequently updates, on the basis of the monitoring result, a communication data amount with respect to each HDD 211 within the disk load table 322. As described later, when the communication data amount has exceeded a predetermined threshold value, the switching determination unit 312 determines that an access load on the HDD 211 associated with that communication data amount has become excessive.

FIG. 10 is a diagram illustrating an example of information registered in a server load table. The server load table 323 is a management table used for holding a parameter indicating a load state of each object storage server 220.

In the server load table 323, a "processor usage rate", a "free memory", and a "communication data amount" are registered as parameters indicating a load state with respect to each "server IP address" used for identifying the object storage server 220. The processor usage rate indicates a usage rate of a processor included in the corresponding object storage server 220. The usage rate is the percentage of a time the processor executing a program within a unit time. The free memory indicates a remaining capacity of a main memory (RAM) included in the corresponding object storage server 220. The communication data amount indicates an amount of data the corresponding object storage server 220 has transmitted or received to or from the HDD 211 connected to the self-device in the latest unit time.

The switching determination unit 312 acquires, from each object storage server 220, the processor usage rate, the free memory, and the communication data amount with respect to a given period of time, and overwrites and registers the processor usage rate, the free memory, and the communication data amount in the server load table 323. As described later, the switching determination unit 312 compares the processor usage rate, the free memory, and the communication data amount with predetermined threshold values, and hence, determines an object storage server 220 whose load has become excessive.

FIG. 11 is a diagram illustrating an example of information registered in a PHY table. In the PHY table 331, an ID of each PHY provided in the SAS expander 230 and an SAS address of a device connected to the PHY indicated by the ID are registered in association with each other. According to the present embodiment, the device connected to the PHY is one of the object storage servers 220 or one of the HDDs 211 within the disk enclosure 210.

To be precise, the SAS address corresponding to the object storage server 220 indicates an SAS address of the HBA 221 mounted in the object storage server 220. However, hereinafter, for ease of explanation, the SAS address of the HBA 221 mounted in the object storage server 220 is simply referred to as "the SAS address of the object storage server 220".

Figure 12:
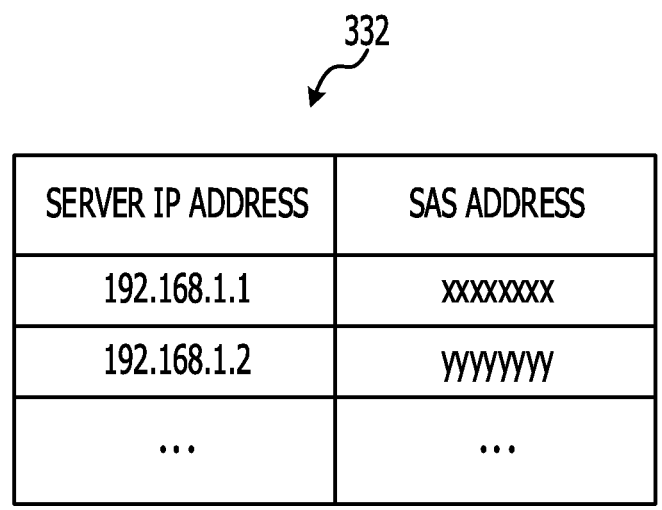
FIG. 12 is a diagram illustrating an example of information registered in a server address table.

FIG. 12 is a diagram illustrating an example of information registered in a server address table. In the server address table 332, an IP address (server IP address) of each object storage server 220 and an SAS address are registered in association with each other.

After the object storage server 220 and the HDD 211 have been connected to the SAS expander 230 and the operation of the storage system 200 has been started, the registration information of the above-mentioned PHY table 331 and server address table 332 is not changed as long as the object storage server 220 or the HDD 211 is not demounted or added.

When updating the zoning table 237 within the SAS expander 230, the switching control unit 313 specifies a target of connection switching by an ID of a PHY. On the other hand, the switching determination unit 312 identifies a target of connection switching, on the basis of the IP address of the object storage server 220 and the device name of the HDD 211. Therefore, when the switching determination unit 312 has determined the device of a connection switching target, the switching control unit 313 refers to the above-mentioned PHY table 331 and server address table 332 and identifies the ID of the PHY to which the determined device is connected.

Figure 13:
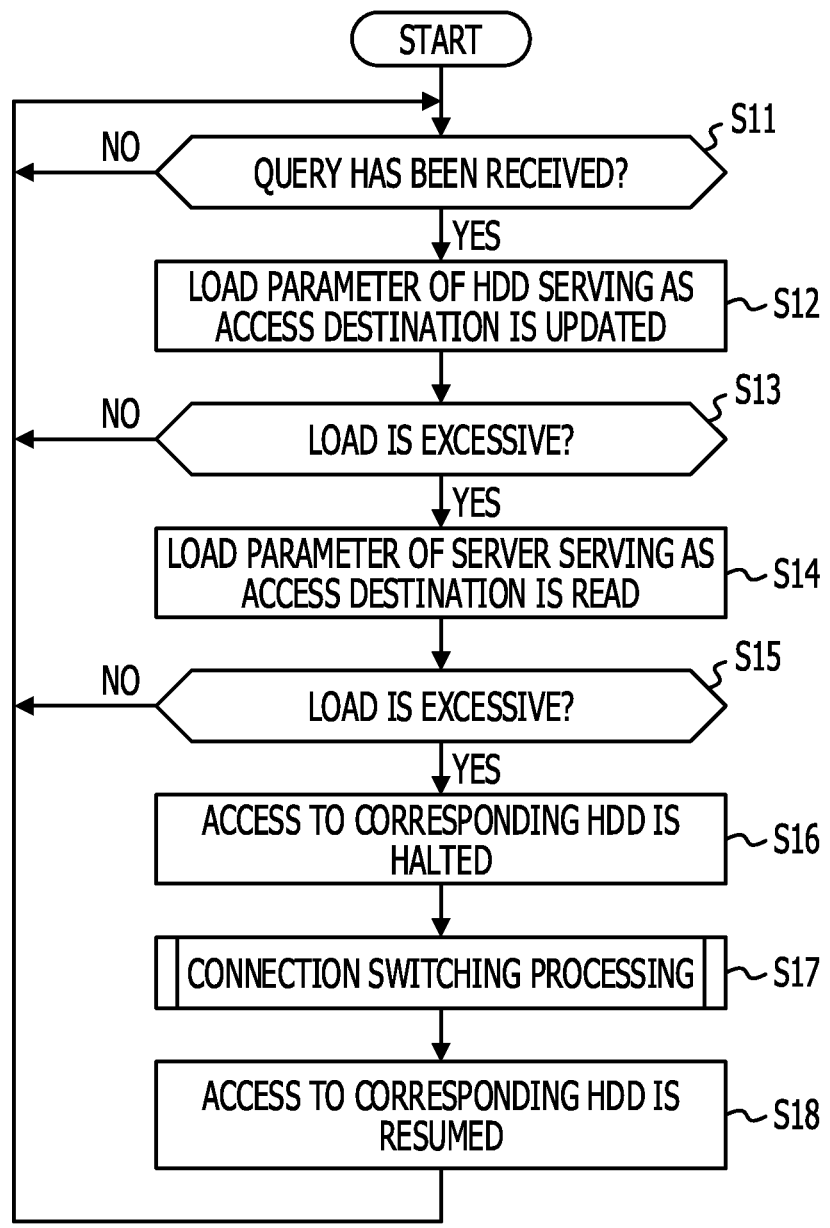
FIG. 13 is a flowchart illustrating an example of switching control processing performed on an SAS expander.

Next, using a flowchart, processing will be described that controls a switching operation in the SAS expander 230 in response to the load state of the object storage server 220. FIG. 13 is a flowchart illustrating an example of switching control processing performed on an SAS expander.

(S11) The switching determination unit 312 monitors whether the I/O processing unit 311 has received a query transmitted from a user terminal 130, and when having determined that the I/O processing unit 311 has received a query, the switching determination unit 312 executes a processing operation in S12.

(S12) The switching determination unit 312 updates a parameter corresponding to an HDD 211 serving as an access destination based on the query, from among the parameters (communication data amount in FIG. 9) registered in the disk load table 322 and indicating load states.

Specifically, from the content of the query the I/O processing unit 311 has received, the switching determination unit 312 determines an amount of data to be transmitted or received to or from the HDD 211 serving as the access destination. For example, when storing an object has been requested, the switching determination unit 312 regards, as a transmission/reception data amount, the actual data amount of the object to be stored, and when reading an object has been requested, the switching determination unit 312 regards, as a transmission/reception data amount, the actual data amount of the object to be read.

The switching determination unit 312 acquires an IP address of an object storage server 220 serving as an access destination and a device name of an HDD 211 serving as an access destination from the I/O processing unit 311 on the basis of the received query. The switching determination unit 312 identifies, from the disk load table 322, a record 322a in which the acquired IP address is registered. The switching determination unit 312 adds the transmission/reception data amount determined by the above-mentioned procedure to a communication data amount associated with the device name acquired from the I/O processing unit 311 in the identified record 322a.

While not illustrated, the switching determination unit 312 initializes, to "0", communication data amount corresponding to all the device names registered in the disk load table 322, with respect to each given period of time. Accordingly, the communication data amount registered in the disk load table 322 turn out to indicate communication data amount with respect to each unit time.

The switching determination unit 312 may update the parameters in the disk load table 322 only when the user terminal 130 has requested to read data.

While, in the present embodiment, the communication data amount is registered as the parameter indicating the load state of the HDD 211 in the disk load table 322, an access frequency per unit time, for example, may be registered as a parameter. In this case, in S12, the switching determination unit 312 increments, by "1", a parameter associated with the HDD 211 serving as an access destination.

(S13) The switching determination unit 312 compares the communication data amount updated in S12 with a predetermined threshold value. When the communication data amount exceeds the threshold value, the switching determination unit 312 determines that the load of the HDD 211 serving as an access destination has become excessive, and executes a processing operation in S14. On the other hand, when the communication data amount is less than or equal to the threshold value, the switching determination unit 312 determines that the load of the HDD 211 serving as an access destination is not excessive, and executes the processing operation in S11.

(S14) The switching determination unit 312 reads, from the server load table 323, parameters that indicate a load state and are associated with the object storage server 220 serving as an access destination based on the received query. According to the present embodiment, the processor usage rate, the free memory, and the communication data amount illustrated in FIG. 10 are read as the parameters.

(S15) The switching determination unit 312 compares each of the read parameters with a threshold value preliminarily defined with respect to each parameter, and on the basis of the comparison result, determines whether or not the load of the object storage server 220 serving as an access destination is excessive. When the result of comparison with a threshold value relating to at least one of the individual parameters indicates that the load is excessive, the switching determination unit 312 determines that the load of the object storage server 220 serving as an access destination is excessive, and executes a processing operation in S16.

Here, a case where the load is determined to be excessive is a case where at least one of three conditions is satisfied. The three conditions are that the processor usage rate exceeds a predetermined threshold value, that the value of the free memory value is less than a predetermined threshold value, and that the communication data amount exceeds a predetermined threshold value.

When determined as "Yes" in S15, the HDD 211 serving as an access destination based on the query received in S11 is determined as the target of connection switching. The HDD 211 determined at this time turns out to be an HDD 211 whose transmission/reception data amount is the largest among a plurality of HDDs 211 connected to the same object storage server 220.

On the other hand, when the results of comparison with threshold values relating to all the parameters do not indicate that the load is excessive, the switching determination unit 312 executes a processing operation in S11. In other words, even if it has been determined that the load of one HDD 211 is excessive, when it has been determined that the load of the object storage server 220 to route through when that HDD 211 is accessed is not excessive, the switching determination unit 312 determines that the object storage server 220 connected to that HDD 211 need not be changed.

A relationship between the comparison result of each parameter and the determination result in S15 based thereon is not limited to the above-mentioned relationship. For example, the switching determination unit 312 may determine that the load is excessive when two or more of the above-mentioned three conditions are satisfied.

(S16) The switching determination unit 312 causes the I/O processing unit 311 to temporarily halt access to the HDD 211 serving as an access destination based on the received query. This S16 is for avoiding occurrence of an error due to the execution of access to the HDD 211 serving as a switching target in the process of the switching operation in the SAS expander 230.

(S17) Owing to processing operations of the switching determination unit 312 and the switching control unit 313, connection switching processing in the SAS expander 230 is executed. While the detail of S17 will be described later, at least the object storage server 220 connected to the HDD 211 serving as an access destination based on the query received in S11 is switched to another object storage server 220.

(S18) After the completion of connection switching processing, the switching determination unit 312 resumes access to the HDD 211 to which the I/O processing unit 311 has been caused to temporarily halt the access. At this time, as the HDD 211 to which the access is resumed, at least the HDD 211 to which the access has been halted in S16 is included. In addition, when access to another HDD 211 has been halted owing to the processing operation in S17, access to that HDD 211 is also resumed in S18.

Next, as for the connection switching processing in S17, two examples will be described. A first example of switching processing will be described with reference to FIG. 14 and FIG. 15, and a second example of switching processing will be described with reference to FIG. 16 and FIG. 17.

First Example of Switching Processing

Figure 14:
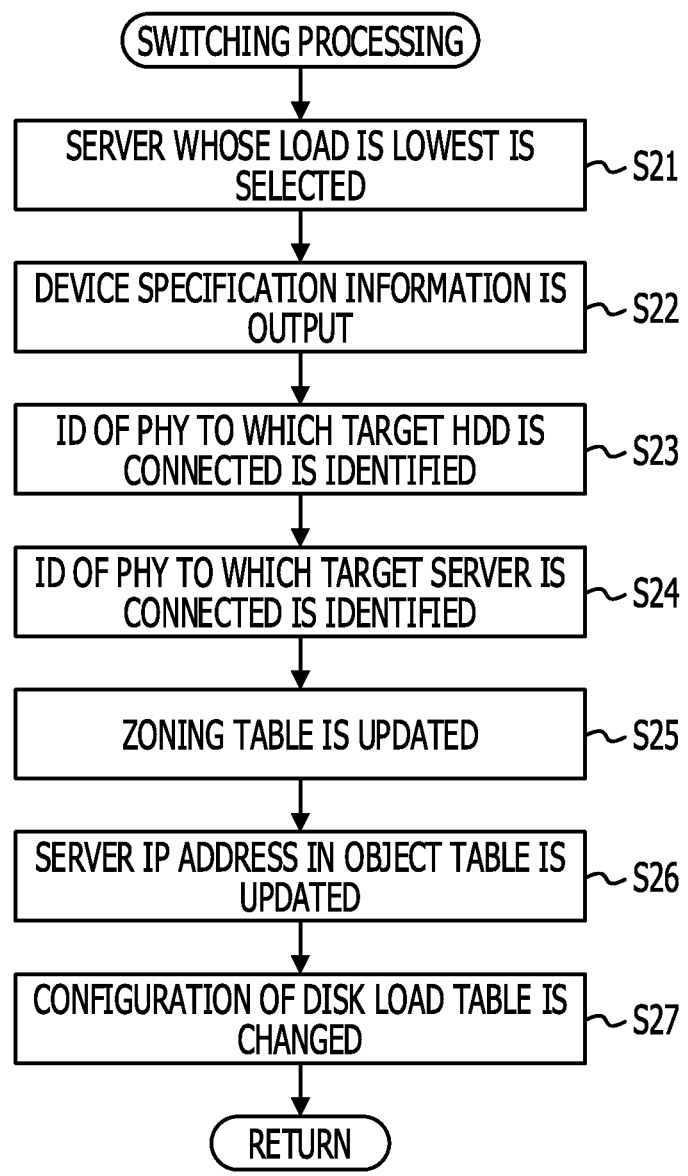
FIG. 14 is a flowchart illustrating an example of switching processing.

The first example of switching processing is processing where only the HDD 211 serving as an access destination based on the query received in S11 in FIG. 13 is the target of connection switching. FIG. 14 is a flowchart illustrating the first example of switching processing.

(S21) On the basis of parameters with respect to each object storage server 220, registered in the server load table 323, the switching determination unit 312 selects an object storage server 220 whose load is considered to be the lowest.

For example, the switching determination unit 312 selects, as an object storage server 220 whose load is the lowest, an object storage server 220 satisfying the largest number of conditions from among three conditions which are that the processor usage rate is the lowest, that the value of the free memory value is the largest, and that the communication data amount is the smallest. When there are a plurality of object storage servers 220 satisfying the largest number of above-mentioned conditions, the switching determination unit 312 may select an object storage server 220 satisfying the large number of conditions relating to parameters whose priorities are high, for example, as the object storage server 220 whose load is the lowest.

(S22) The switching determination unit 312 outputs, to the switching control unit 313, device specification information including a device name of the HDD 211 serving as an access destination based on the query received in S11 in FIG. 13 and an IP address of the object storage server 220 selected in S21. This device specification information is information used for instructing to switch the object storage server 220 currently connected to the corresponding HDD 211, to another object storage server 220 specified by the device specification information.

(S23) The switching control unit 313 identifies an ID of a PHY, in the SAS expander 230, to which the HDD 211 specified by the device specification information from the switching determination unit 312 is connected.

Specifically, the switching control unit 313 sends inquiries to the object storage server 220 serving as an access destination based on the query received in S11 in FIG. 13, about an SAS address of the HDD 211 specified by the device specification information. By transmitting an Isscsi command to the specified HDD 211, for example, the object storage server 220 having received the inquiries acquires the SAS address of that HDD 211 and notices the switching control unit 313 of the SAS address. The switching control unit 313 reads, from the PHY table 331, an ID of a PHY associated with the SAS address given notice of.

(S24) The switching control unit 313 identifies an ID of a PHY, in the SAS expander 230, to which the object storage server 220 specified by the device specification information from the switching determination unit 312 is connected.

Specifically, the switching control unit 313 reads, from the server address table 332, an SAS address associated with a server IP address included in the device specification information. The switching control unit 313 reads, from the PHY table 331, an ID of a PHY associated with the SAS address read from the server address table 332.

Owing to the above-mentioned S23 and S24, the switching control unit 313 identifies the IDs of the PHYs to which the HDD 211 and the object storage server 220, specified by the device specification information, are individually connected.

(S25) The switching control unit 313 transmits, to the SAS expander 230, an SMP command used for requesting table update. With this SMP command, the switching control unit 313 instructs the SAS expander 230 to update the zoning table 237 in the SAS expander 230 so that the HDD 211 and the object storage server 220, specified by the device specification information, are connected to each other.

When having received, from the SAS expander 230, notification of completion of the update of the zoning table 237, the switching control unit 313 notifies the switching determination unit 312 of the completion of connection switching.

(S26) In accordance with a connection relationship between the object storage server 220 and the HDD 211 after the connection switching, the switching determination unit 312 updates the server IP address in the object table 321. Specifically, the switching determination unit 312 rewrites, in the object table 321, the server IP address associated with the device name included in the device specification information output in S22, to the IP address of the object storage server 220 included in that device specification information.

According to the present embodiment, even if the connection switching has been executed, relocation of an object between the HDDs 211 is not executed. Therefore, even if the connection switching has been executed, a relationship between the hash value and the HDD 211 in the object table 321 does not change, and only a relationship between the hash value and the object storage server 220 is changed.

(S27) The switching determination unit 312 changes the configuration of records 322a, from among the records 322a in the disk load table 322, corresponding to object storage servers 220 for which HDDs 211 connected thereto have been changed.

Figure 15:
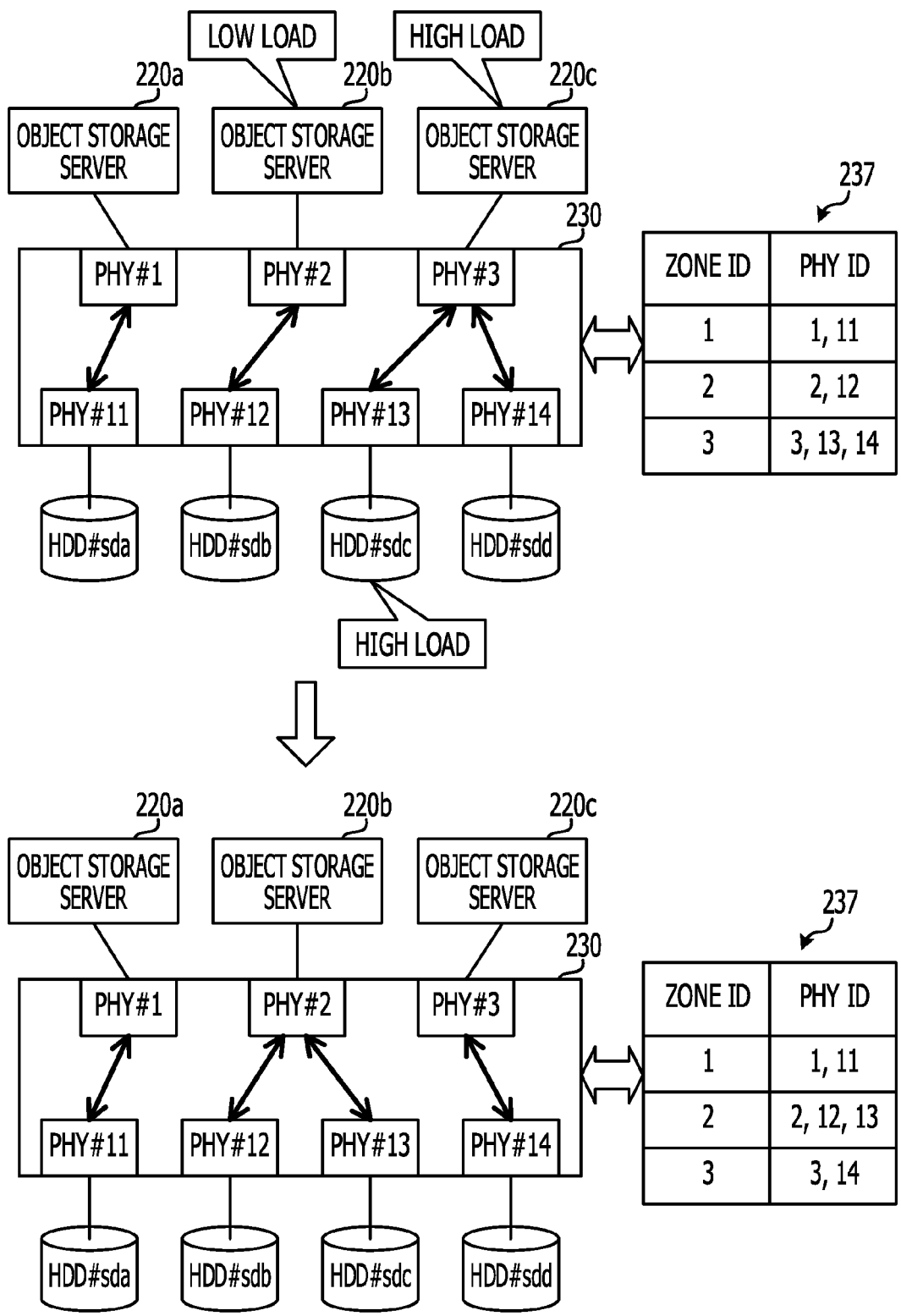
FIG. 15 is a diagram illustrating an example of an operation of connection switching.

FIG. 15 is a diagram illustrating an example of an operation of connection switching.

In the example in FIG. 15, the object storage servers 220a, 220b, and 220c are connected to the PHY#1, PHY#2, and PHY#3 in the SAS expander 230, respectively, and the HDD#sda, HDD#sdb, HDD#sdc, and HDD#sdd are connected to the PHY#11, PHY#12, PHY#13, and PHY#14, respectively. It is assumed that, in a state before the connection switching, the PHY#1 is conductively connected to the PHY#11, the PHY#2 is conductively connected to the PHY#12, and the PHY#3 is conductively connected to the PHY#13 and PHY#14.

Here, it is assumed that the switching determination unit 312 has determined that the load of the HDD#sdc has become excessive (S13 in FIG. 13) and the load of the object storage server 220c connected to the HDD#sdc has become excessive (S15 in FIG. 13). In addition, it is assumed that the switching determination unit 312 has determined that, from among the other object storage servers 220a and 220b, the load of the object storage server 220b is the lowest (S21 in FIG. 14).

In this case, the switching determination unit 312 outputs the device specification information including a device name, "sdc", of the HDD#sdc and an IP address of the object storage server 220b (S22 in FIG. 14). In accordance with this device specification information, as illustrated in the bottom section of FIG. 15, the zoning table 237 is rewritten so that the ID "13" of the PHY#13 to which the HDD#sdc is connected and the ID "2" of the PHY#2 to which the object storage server 220b is connected are associated with the same zone ID "2".

Accordingly, the I/O processing unit 311 turns out to access the HDD#sdc through the object storage server 220b, in place of the object storage server 220c, and the load of the object storage server 220c is reduced. Accordingly, loads are distributed between the object storage server 220b and the object storage server 220c. In addition, the reduction of the access speed to the HDD#sdc is suppressed, and the reduction of the access speed to the HDD#sdd remaining connected to the object storage server 220c is also avoided.

Second Example of Switching Processing

Figure 16:
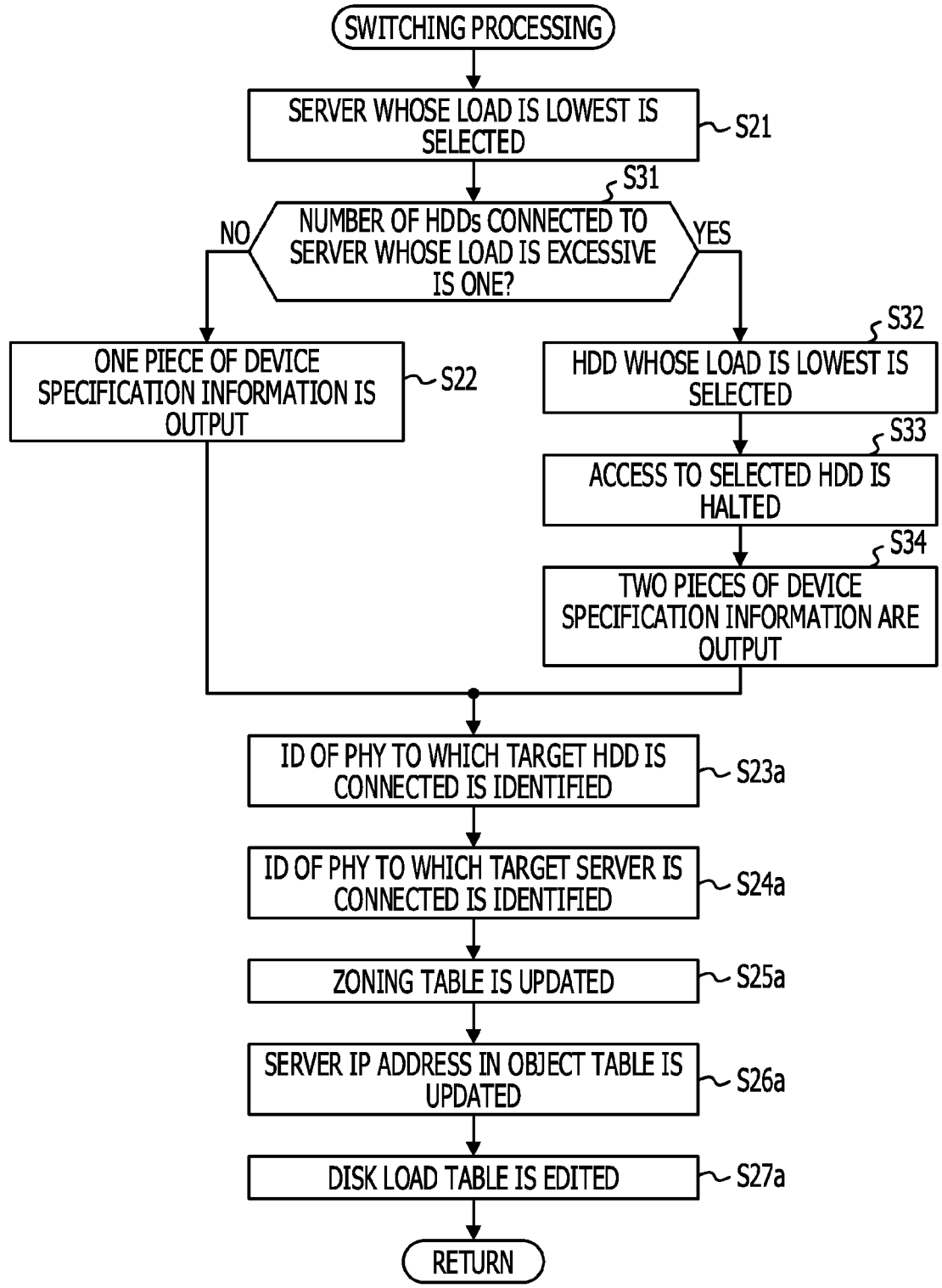
FIG. 16 is a flowchart illustrating an example of switching processing.

The second example of switching processing is processing where two HDDs 211 including the HDD 211 serving as an access destination based on the query received in S11 in FIG. 13 are the targets of connection switching and the object storage servers 220 connected to the individual HDDs 211 are replaced with each other. FIG. 16 is a flowchart illustrating the second example of switching processing. In FIG. 16, a similar number will be assigned to a processing operation similar to a processing operation in the FIG. 14, and the description thereof will be omitted.

(S31) On the basis of the object table 321 or the disk load table 322, the switching determination unit 312 determines whether the number of HDDs 211 connected to the object storage server 220 (the object storage server 220 whose load has been determined to be excessive) serving as an access destination based on the query received in S11 in FIG. 13 is one or more than one.

When the number of connected HDDs 211 is one, the switching determination unit 312 executes a processing operation in S32. In other words, in the second example of switching processing, only when the number of HDDs 211 connected to the object storage server 220 whose load has been determined to be excessive is one, the object storage servers 220 connected to individual two HDDs 211 are replaced with each other.

On the other hand, when the number of connected HDDs 211 is two or more, the switching determination unit 312 executes the processing operation in S22, and outputs only one piece of the device specification information to the switching control unit 313.

(S32) The switching determination unit 312 refers to the disk load table 322, and selects an HDD 211 whose load is the lowest, from among the HDDs 211 connected to the object storage server 220 selected in S21. When the number of HDDs 211 connected to the object storage server 220 selected in S21 is one, that HDD 211 is selected as the HDD 211 whose load is the lowest. The HDD 211 selected in S32 becomes the target of connection switching.

(S33) The switching determination unit 312 causes the I/O processing unit 311 to temporarily halt access to the HDD 211 selected in S32.

(S34) The switching determination unit 312 generates two pieces of device specification information.

In the same way as in S22, the switching determination unit 312 generates first device specification information including a device name of an HDD 211 serving as an access destination based on the query received in S11 in FIG. 13 and an IP address of the object storage server 220 selected in S21.

In addition, the switching determination unit 312 generates second device specification information including a device name of the HDD 211 selected in S32 and an IP address of an object storage server 220 serving as an access destination based on the query received in S11 in FIG. 13.

The switching determination unit 312 outputs the first device specification information and the second device specification information to the switching control unit 313.

(S23a to S27a) After the execution of the above-mentioned S22 or S34, processing operations in S23a to S27a are executed. Here, when S22 has been executed (in other words, when two or more HDDs 211 are connected to the object storage server 220 whose load has been determined to be excessive), the same processing operations as in S23 to S27 in FIG. 14 are executed in S23a to S27a. On the other hand, when S34 has been executed (in other words, when only one HDD 211 is connected to the object storage server 220 whose load has been determined to be excessive), the same processing operations as in S23 to S27 are executed in S23a to S27a on the two pieces of the device specification information output in S34, respectively.

Figure 17:
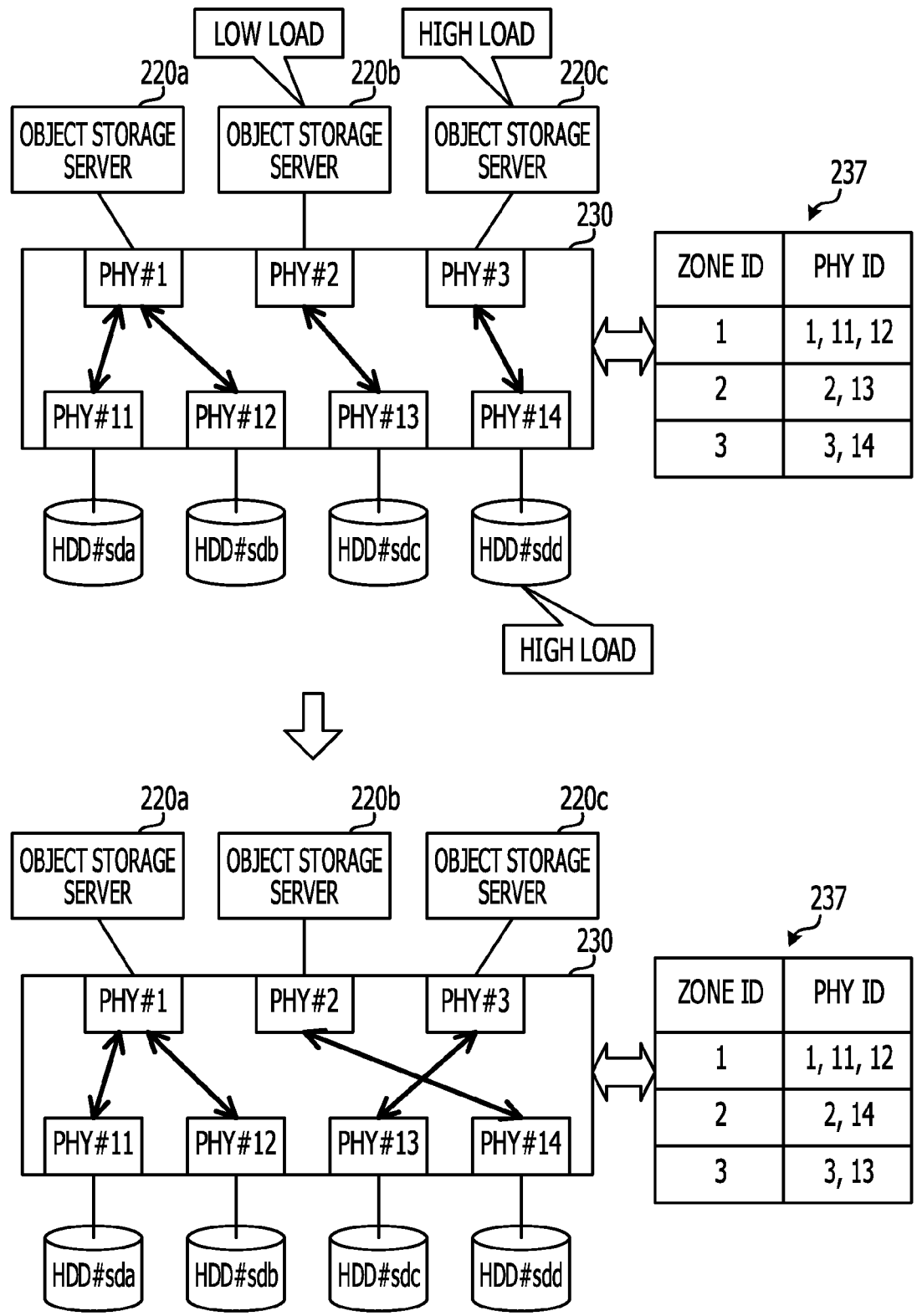
FIG. 17 is a diagram illustrating an example of an operation of connection switching.

FIG. 17 is a diagram illustrating an example of an operation of connection switching.

In the example in FIG. 17, the object storage servers 220a, 220b, and 220c are connected to the PHY#1, PHY#2, and PHY#3 in the SAS expander 230, respectively, and the HDD#sda, HDD#sdb, HDD#sdc, and HDD#sdd are connected to the PHY#11, PHY#12, PHY#13, and PHY#14, respectively. It is assumed that, in a state before the connection switching, the PHY#1 is conductively connected to the PHY#11 and PHY#12, the PHY#2 is conductively connected to the PHY#13, and the PHY#3 is conductively connected to the PHY#14.

Here, it is assumed that the switching determination unit 312 has determined that the load of the HDD#sdd has become excessive (S13 in FIG. 13) and the load of the object storage server 220c connected to the HDD#sdd has become excessive (S15 in FIG. 13). In addition, it is assumed that the switching determination unit 312 has determined that, from among the other object storage servers 220a and 220b, the load of the object storage server 220b is the lowest (S21 in FIG. 16).

In this case, the switching determination unit 312 outputs the first device specification information including a device name "sdd" of the HDD#sdd and an IP address of the object storage server 220b. Along with this, the switching determination unit 312 outputs the second device specification information including a device name "sdc" of the HDD#sdc connected to the object storage server 220b and an IP address of the object storage server 220c whose load has been determined to be excessive (S34 in FIG. 16).

As illustrated in the bottom section of FIG. 17, in accordance with the first device specification information, the zoning table 237 is rewritten so that the ID "14" of the PHY#14 to which the HDD#sdd is connected and the ID "2" of the PHY#2 to which the object storage server 220b is connected are associated with the same zone ID "2". Accordingly, the HDD#sdd and the object storage server 220b are connected to each other.

In addition, in accordance with the second device specification information, the zoning table 237 is rewritten so that the ID "13" of the PHY#13 to which the HDD#sdc is connected and the ID "3" of the PHY#3 to which the object storage server 220c is connected are associated with the same zone ID "3". Accordingly, the HDD#sdc and the object storage server 220c are connected to each other.

In other words, the object storage servers individually connected to the HDD#sdc and the HDD#sdd are replaced with each other. Accordingly, loads are distributed between the object storage server 220b and the object storage server 220c.

Here, when the above-mentioned first example of switching processing has been executed in the case in FIG. 17, the other PHY conductively connected to the PHY#14 is only switched from the PHY#3 to the PHY#2. In this case, a state occurs where no HDD 211 is connected to the object storage server 220c connected to the PHY#3, and the object storage server 220c is wasted. On the other hand, according to the second example of switching processing, since object storage servers connected to two PHYs on an HDD side are replaced with each other, a state does not occur where no HDD 211 is connected to the object storage server 220c. Accordingly, the usage efficiency of the object storage servers 220 is improved.

In addition, in the second example of switching processing, when two or more HDDs 211 are connected to the object storage server 220 whose load has been determined to be excessive, the same processing as the first example of switching processing is performed without performing the replacement of servers. In this case, since the number of HDDs 211 serving as the targets of connection switching is one, the number of HDDs 211 where access thereto is halted becomes one. Accordingly, it may be possible to reduce the influence of the connection switching operation on processing in response to queries from the user terminals 130.

The first and second examples of switching processing described above are just examples of connection switching processing, and a connection state in the SAS expander 230 may be switched by another method where loads are distributed among the object storage servers 220.

Third Embodiment

Figure 18:
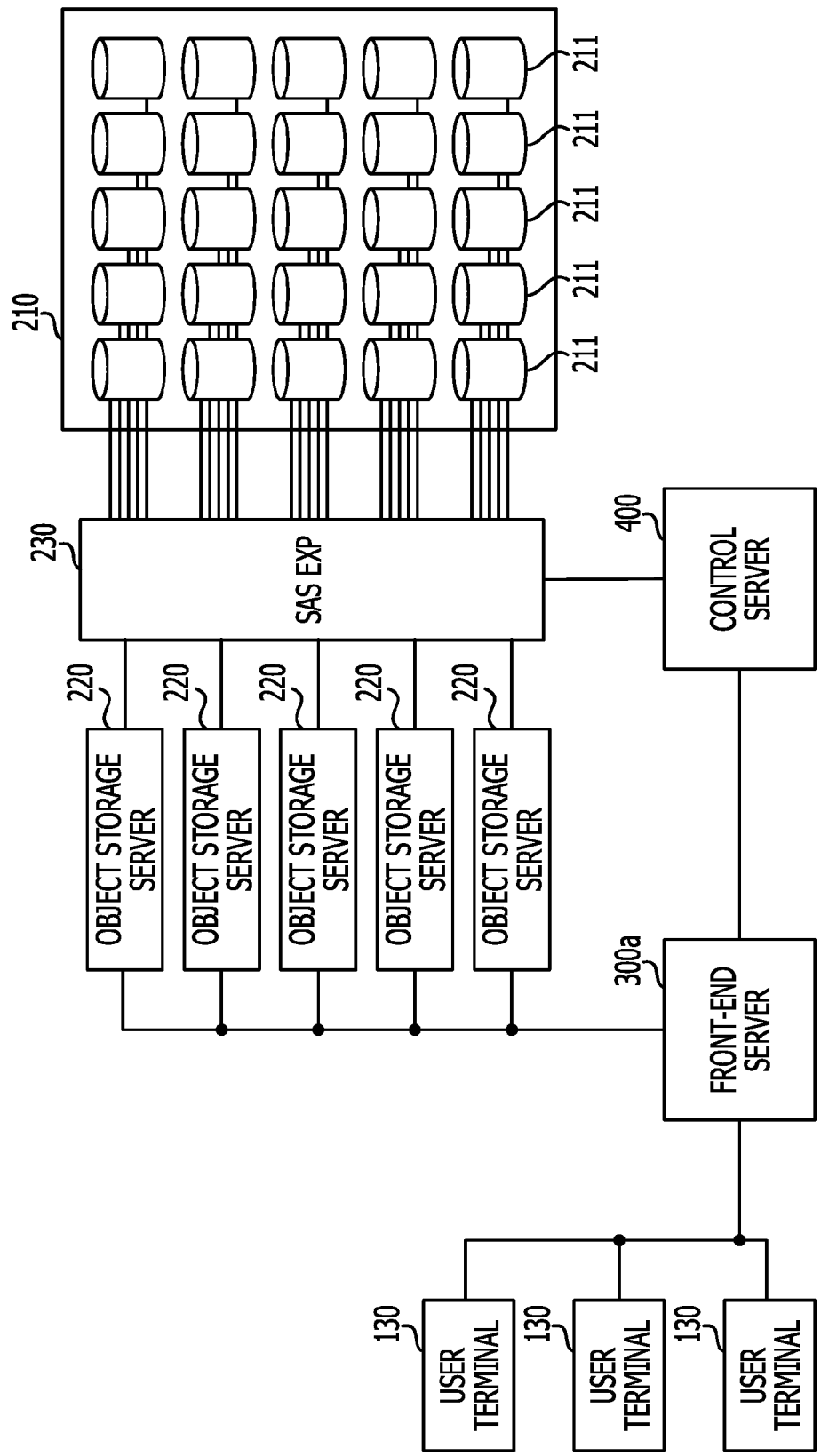
FIG. 18 is a diagram illustrating an example of an entire configuration of a storage system according to a third embodiment.

FIG. 18 is a diagram illustrating an example of an entire configuration of a storage system according to a third embodiment. In FIG. 18, a similar symbol is assigned to a configuration element executing processing similar to processing in FIG. 3, and the description thereof will be omitted.

A storage system 200a in FIG. 18 is a system where a newly provided control server 400 is caused to be equipped with a portion of the processing function the front-end server 300 included in the storage system 200 in FIG. 3. A front-end server 300a in FIG. 18 is a device equipped with the processing function in the front-end server 300 in FIG. 3 except for the processing function relocated to the control server 400.

For example, it may be possible to realize the front-end server 300a and the control server 400 as computers including the hardware configuration illustrated in FIG. 4.

FIG. 19 is a block diagram illustrating examples of individual processing functions of a front-end server and a control server according to the third embodiment. In FIG. 19, a similar symbol is assigned to a configuration element executing processing similar to processing in FIG. 7, and the description thereof will be omitted.

The control server 400 includes a function corresponding to the switching control unit 313 from among the processing functions of the front-end server 300 in FIG. 7. A switching control unit 313a in FIG. 19 performs processing corresponding to the switching control unit 313 in FIG. 7. The PHY table 331 and the server address table 332 are stored in a non-volatile storage device in the control server 400. On the other hand, a switching determination unit 312a in the front-end server 300a performs processing corresponding to the switching determination unit 312 in FIG. 7.

Processing of the switching control unit 313a and the switching determination unit 312a is different from processing of the switching control unit 313 and the switching determination unit 312 in FIG. 7 in the following point.

In order to acquire an SAS address of the HDD 211 specified by the device specification information from the switching determination unit 312a, the switching control unit 313a requests, for example, the switching determination unit 312a in the front-end server 300a to execute an inquiry about the SAS address. Upon receiving the request, the switching determination unit 312a sends inquiries to an object storage server 220 serving as an access destination based on a query received by the I/O processing unit 311, about the SAS address of the HDD 211.

The switching determination unit 312a notifies the switching control unit 313a in the control server 400 of the SAS address the object storage server 220 has given notice of in response to the inquiry. The switching control unit 313a reads, from the PHY table 331, an ID of a PHY associated with the SAS address given notice of.

For example, the switching control unit 313a may directly send inquiries to the object storage server 220 about the SAS address.

According to the above-mentioned third embodiment, in the same way as in the second embodiment, it may be possible to dynamically change a connection state in the SAS expander 230 and distribute loads between the object storage servers 220. Accordingly, it may be possible to suppress the reduction of performance for accessing the HDDs 211.

As described above, using a computer, it may be possible to realize the processing functions of the devices (for example, the access control devices 2a and 2b, the connection control device 5, the object storage server 220, the front-end servers 300 and 300a, and the control server 400) illustrated in the above-mentioned individual embodiments. In that case, a program describing the content of processing of a function each device is to have is provided, and the program is executed in the computer to realize the above-mentioned processing functions.

The program describing the content of processing may be recorded in a computer-readable recording medium. Examples of the computer-readable recording medium include a magnetic storage device, an optical disk, a magneto-optical recording medium, a semiconductor memory, or the like. Examples of the magnetic storage device include an HDD, a flexible disk (FD), a magnetic tape, and the like. Examples of the optical disk include a DVD, a DVD-RAM, a CD-ROM, a CD-R/RW, and the like. Examples of the magneto-optical recording medium include a magneto-optical disk (MO) and the like.

When the program is distributed, portable recording media such as DVDs or CD-ROMs in which that program is recorded are on sale, for example. In addition, the program may be stored in a storage device in a server computer, and the program may be transferred from the server computer to another computer through a network.

The computer executing the program stores, for example, the program recoded in the portable recording medium or the program transferred from the server computer in a storage device of the computer. The computer reads the program from the storage device, and performs processing by executing the program. The computer may directly read the program from the portable recording medium and execute the program. In addition, every time the program is transferred from the server computer connected through the network, the computer may sequentially execute the received program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage system comprising:
a plurality of storage devices;
a plurality of access control devices, each of the access control devices controlling access to one or more of the plurality of storage devices;
a relay device to connect each of the plurality of storage devices to one of the plurality of access control devices; and
a connection control device connected to the relay device and to each of the plurality of access control devices and configured to instruct, in response to load states received from each of the plurality of access control devices, the relay device to switch a connection from between one or more of the plurality of storage devices and one of the plurality of access control devices to a connection between the one or more of the plurality of storage devices and one or more other access control devices from among the plurality of access control devices, wherein
when a first load parameter indicating a load state of a first access control device exceeds a predetermined threshold value and a second load parameter indicating a load state of a second access control device is less than or equal to the predetermined threshold value, the connection control device instructs the relay device to disconnect a first storage device from the first access control device and to connect the first storage device to the second access control device so as to switch an access control device connected to the first storage device from the first access control device to the second access control device, the first storage device having a maximum amount of transfer data per unit time among storage devices connected to the first access control device.

2. The storage system according to claim 1, wherein
the connection control device instructs the relay device to disconnect a second storage device from the second access control device and to connect the second storage device to the first access control device so as to switch an access control device connected to the second storage device from the second access control device to the first access control device.

3. The storage system according to claim 1, further comprising:
a front-end processing device to access a first storage device through a first access control device connected to the first storage device, wherein
the connection control device notifies, upon instructing the relay device to switch an access control device connected to the first storage device from the first access control device to a second access control device, the front-end processing device of the switching.

4. The storage system according to claim 3, wherein
the front-end processing device accesses, upon receiving first identification information for identifying an object, a storage device corresponding to the object through an access control device corresponding to the object, on the basis of a correspondence table in which a calculated value based on the first identification information, second identification information for identifying the storage device corresponding to the object, and third identification information for identifying the access control device corresponding to the object are associated with one another, and
the connection control device updates, upon instructing the relay device to switch an access control device connected to the first storage device from the first access control device to the second access control device, the correspondence table so as to reflect the switching.

5. A method for controlling a storage system including a plurality of storage devices and a plurality of access control devices, the method comprising:
connecting, by a relay device, each of the plurality of storage devices to one of the plurality of access control devices;
controlling, by each of the plurality of access control devices, access to one or more of the plurality of storage devices connected to each of the plurality of access control devices;
instructing, by a connection control device that is connected to the relay device and to each of the plurality of access control devices, in response to load states received from each of the plurality of access control devices, the relay device to switch a connection from between one or more of the plurality of storage devices and one of the plurality of access control devices to a connection between the one or more of the plurality of storage devices and one or more other access control devices from among the plurality of access control devices; and
when a first load parameter indicating a load state of a first access control device exceeds a predetermined threshold value and a second load parameter indicating a load state of a second access control device is less than or equal to the predetermined threshold value, instructing, by the connection control device, the relay device to disconnect a first storage device from the first access control device and to connect the first storage device to the second access control device so as to switch an access control device connected to the first storage device from the first access control device to the second access control device, the first storage device having a maximum amount of transfer data per unit time among storage devices connected to the first access control device.

6. The method according to claim 5, wherein
the connection control device instructs the relay device to disconnect a second storage device from the second access control device and
to connect the second storage device to the first access control device
so as to switch an access control device connected to the second storage device from the second access control device to the first access control device.

7. The method according to claim 5, further comprising:
accessing, by a front-end processing device, a first storage device through a first access control device connected to the first storage device,
wherein
the connection control device notifies, upon instructing the relay device to switch an access control device connected to the first storage device from the first access control device to a second access control device, the front-end processing device of the switching.

8. The method according to claim 7, wherein
the front-end processing device accesses, upon receiving first identification information for identifying an object, a storage device corresponding to the object through an access control device corresponding to the object, on the basis of a correspondence table in which a calculated value based on the first identification information, second identification information for identifying the storage device corresponding to the object, and third identification information for identifying the access control device corresponding to the object are associated with one another, and
the connection control device updates, upon instructing the relay device to switch an access control device connected to the first storage device from the first access control device to the second access control device, the correspondence table so as to reflect the switching.

9. A storage system comprising:
a plurality of storage devices;
a plurality of access control devices, each of the access control devices controlling access to one or more of the plurality of storage devices;
a relay device to connect each of the plurality of storage devices to one of the plurality of access control devices;
a connection control device connected to the relay device and to each of the plurality of access control devices and configured to instruct, in response to load states received from each of the plurality of access control devices, the relay device to switch a connection from between one or more of the plurality of storage devices and one of the plurality of access control devices to a connection between the one or more of the plurality of storage devices and one or more other access control devices from among the plurality of access control devices; and
a front-end processing device to access a first storage device through a first access control device connected to the first storage device, wherein
the connection control device notifies, upon instructing the relay device to switch an access control device connected to the first storage device from the first access control device to a second access control device, the front-end processing device of the switching,
the front-end processing device accesses, upon receiving first identification information for identifying an object, a storage device corresponding to the object through an access control device corresponding to the object, on the basis of a correspondence table in which a calculated value based on the first identification information, second identification information for identifying the storage device corresponding to the object, and third identification information for identifying the access control device corresponding to the object are associated with one another, and the connection control device updates, upon instructing the relay device to switch an access control device connected to the first storage device from the first access control device to the second access control device, the correspondence table so as to reflect the switching.

\* \* \* \* \*